US012585359B2

(12) United States Patent
Lee et al.

(10) Patent No.: US 12,585,359 B2
(45) Date of Patent: Mar. 24, 2026

(54) DISPLAY APPARATUS AND METHOD OF CONTROLLING THE SAME

(71) Applicant: Samsung Display Co., Ltd., Yongin-si (KR)

(72) Inventors: Wonjun Lee, Yongin-si (KR); Siwoo Kim, Yongin-si (KR); Cholho Kim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/951,422

(22) Filed: Nov. 18, 2024

(65) Prior Publication Data

US 2025/0231643 A1     Jul. 17, 2025

(30) Foreign Application Priority Data

Jan. 12, 2024     (KR) ........................ 10-2024-0005474

(51) Int. Cl.
  *G06F 3/041*          (2006.01)
  *G09G 3/3233*        (2016.01)
(52) U.S. Cl.
  CPC ...... *G06F 3/04184* (2019.05); *G06F 3/04164* (2019.05); *G09G 3/3233* (2013.01); *G09G 2310/0251* (2013.01); *G09G 2310/06* (2013.01); *G09G 2310/08* (2013.01); *G09G 2354/00* (2013.01)
(58) Field of Classification Search
  CPC ............ G06F 3/04184; G06F 3/04164; G09G 2310/0251; G09G 2310/06; G09G 2310/08; G09G 2354/00

USPC ......................................................... 345/173
See application file for complete search history.

(56) References Cited

U.S. PATENT DOCUMENTS

| | | | |
|---|---|---|---|
| 9,678,604 B2 | 6/2017 | Lee | |
| 2007/0227785 A1* | 10/2007 | Katsurahira | G06F 3/046 178/18.07 |
| 2014/0078101 A1* | 3/2014 | Katsurahira | G06F 3/0442 345/174 |
| 2015/0002425 A1 | 1/2015 | Lee et al. | |
| 2020/0210018 A1 | 7/2020 | Kim et al. | |
| 2021/0173437 A1 | 6/2021 | Bae et al. | |
| 2022/0011889 A1 | 1/2022 | Shin et al. | |

FOREIGN PATENT DOCUMENTS

| | | |
|---|---|---|
| KR | 10-2015-0003626 A | 1/2015 |
| KR | 10-1750564 B1 | 6/2017 |
| KR | 10-2017-0079916 A | 7/2017 |
| KR | 10-2020-0081185 A | 7/2020 |

(Continued)

*Primary Examiner* — Mark Edwards
(74) *Attorney, Agent, or Firm* — Womble Bond Dickinson (US) LLP

(57) ABSTRACT

A display apparatus includes: a display panel including a display region including pixels located in n rows, where n is a natural number; and a digitizer overlapping with the display panel, the digitizer to transmit a charging signal to an input unit and receive a position signal from the input unit. When the digitizer transmits the charging signal to the input unit, a frequency of the charging signal is synchronized to T, where T is a time taken from when a scan signal is applied to a first row of the display region from among the n rows to when a scan signal is applied to the first row a next time.

18 Claims, 18 Drawing Sheets

(56)                    References Cited

FOREIGN PATENT DOCUMENTS

| KR | 10-2021-0073699 | A | 6/2021 |
| KR | 10-2022-0007825 | A | 1/2022 |
| KR | 10-2022-0090070 | A | 6/2022 |

* cited by examiner

FIG. 4

DISPLAY APPARATUS AND METHOD OF CONTROLLING THE SAME

CROSS-REFERENCE TO RELATED APPLICATION

The present application claims priority to and the benefit of Korean Patent Application No. 10-2024-0005474, filed on Jan. 12, 2024, in the Korean Intellectual Property Office, the entire disclosure of which is incorporated by reference herein.

BACKGROUND

1. Field

Aspects of one or more embodiments relate to a display apparatus and a method of controlling the same.

2. Description of the Related Art

Display apparatuses may be implemented in various suitable forms of electronic apparatuses. For example, a display apparatus may be a mobile phone, a laptop computer, or a tablet PC. In such display apparatuses, various applications may be run, and these applications may be controlled by using an input unit or device, such as a stylus pen. As such, display apparatuses may transmit an electrical signal to the input unit or device, or may receive an electrical signal from the input unit or device.

The above information disclosed in this Background section is for enhancement of understanding of the background of the present disclosure, and therefore, it may contain information that does not constitute prior art.

SUMMARY

In comparative display apparatuses, the quality of a displayed image may be degraded during a process of transmitting an electrical signal to an input unit or device.

One or more embodiments of the present disclosure may be directed to a display apparatus capable of displaying a high-quality image, and a method of controlling the same. However, the aspects and features of the present disclosure are not limited thereto.

Additional aspects and features will be set forth, in part, in the description that follows, and in part, will be apparent from the description, or may be learned by practicing one or more of the presented embodiments of the present disclosure.

According to one or more embodiments of the present disclosure, a display apparatus includes: a display panel including a display region including pixels located in n rows, where n is a natural number; and a digitizer overlapping with the display panel, the digitizer configured to transmit a charging signal to an input unit and receive a position signal from the input unit. When the digitizer transmits the charging signal to the input unit, a frequency of the charging signal is synchronized to T, where T is a time taken from when a scan signal is applied to a first row of the display region from among the n rows to when a scan signal is applied to the first row a next time.

In an embodiment, phases of the charging signal at a moment when a corresponding scan signal is applied to each of the n rows may be the same.

In an embodiment, the frequency of the charging signal may be $(n \times k)/T$, where k is a natural number.

In an embodiment, the charging signal may be a signal to generate an induced current in a charging coil of the input unit.

In an embodiment, the charging signal may have a sine wave waveform.

In an embodiment, phases of the charging signal at a moment when a scan signal application ends in each of the n rows may be the same.

In an embodiment, in each of the n rows, a phase of the charging signal at a moment when a scan signal application ends may be 90 degrees.

In an embodiment, in each of the n rows, a phase of the charging signal at a moment when a scan signal application ends may be 270 degrees.

In an embodiment, the digitizer may include a plurality of first patterns extending to be parallel to the n rows, and the plurality of first patterns may be configured to generate the charging signal.

In an embodiment, the digitizer may further include a plurality of second patterns extending to cross the n rows.

According to one or more embodiments of the present disclosure, a method of controlling a display apparatus including a display panel including pixels located in n rows, where n is a natural number, includes: transmitting, by a digitizer overlapping with the display panel, a charging signal to an input unit; and when the digitizer transmits the charging signal, synchronizing a frequency of the charging signal to T, where T is a time taken from when a scan signal is applied to a first row of a display region from among the n rows to when a scan signal is applied to the first row a next time.

In an embodiment, phases of the charging signal at a moment when a corresponding scan signal is applied to each of the n rows may be the same.

In an embodiment, the frequency of the charging signal may be $(n \times k)/T$, where k is a natural number.

In an embodiment, the charging signal may be a signal to generate an induced current in a charging coil of the input unit.

In an embodiment, the charging signal may have a sine wave waveform.

In an embodiment, phases of the charging signal at a moment when a scan signal application ends in each of the n rows may be the same.

In an embodiment, in each of the n rows, a phase of the charging signal at a moment when a scan signal application ends may be 90 degrees.

In an embodiment, in each of the n rows, a phase of the charging signal at a moment when a scan signal application ends may be 270 degrees.

BRIEF DESCRIPTION OF THE DRAWINGS

The above and other aspects and features of the present disclosure will be more clearly understood from the following detailed description of the illustrative, non-limiting embodiments with reference to the accompanying drawings, in which:

FIG. 4 is a schematic diagram of a configuration of the display apparatus of FIG. 1;

DETAILED DESCRIPTION

Figure 1:
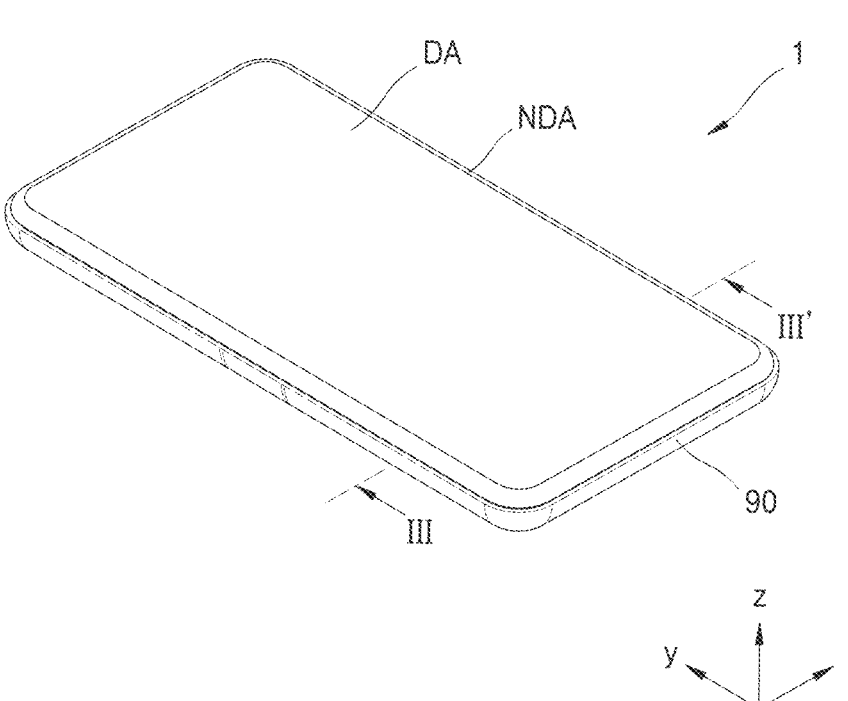
FIG. 1 is a schematic perspective view of a display apparatus according to an embodiment.

Hereinafter, embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described.

Unless otherwise noted, like reference numerals denote like elements throughout the attached drawings and the written description, and thus, redundant description thereof may not be repeated.

When a certain embodiment may be implemented differently, a specific process order may be different from the described order. For example, two consecutively described processes may be performed at the same or substantially at the same time, or may be performed in an order opposite to the described order.

Further, as would be understood by a person having ordinary skill in the art, in view of the present disclosure in its entirety, each suitable feature of the various embodiments of the present disclosure may be combined or combined with each other, partially or entirely, and may be technically interlocked and operated in various suitable ways, and each embodiment may be implemented independently of each other or in conjunction with each other in any suitable manner, unless otherwise stated or implied.

In the drawings, the relative sizes, thicknesses, and ratios of elements, layers, and regions may be exaggerated and/or simplified for clarity. Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

In the figures, the x-axis, the y-axis, and the z-axis are not limited to three axes of the rectangular coordinate system, and may be interpreted in a broader sense. For example, the x-axis, the y-axis, and the z-axis may be perpendicular to or substantially perpendicular to one another, or may represent different directions from each other that are not perpendicular to one another.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "on," "connected to," or "coupled to" another element or layer, it can be directly on, connected to, or coupled to the other element or layer, or one or more intervening elements or layers may be present. Similarly, when a layer, an area, or an element is referred to as being "electrically connected" to another layer, area, or element, it may be directly electrically connected to the other layer, area, or element, and/or may be indirectly electrically connected with one or more intervening layers, areas, or elements therebetween. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, the expression "A and/or B" denotes A, B, or A and B. Expressions such as "at least one of," when preceding a list of elements, modify the entire list of elements and do not modify the individual elements of the list. For example, the expression "at least one of a, b, or c," "at least one of a, b, and c," and "at least one selected from the group consisting of a, b, and c" indicates only a, only b, only c, both a and b, both a and c, both b and c, all of a, b, and c, or variations thereof.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 2:
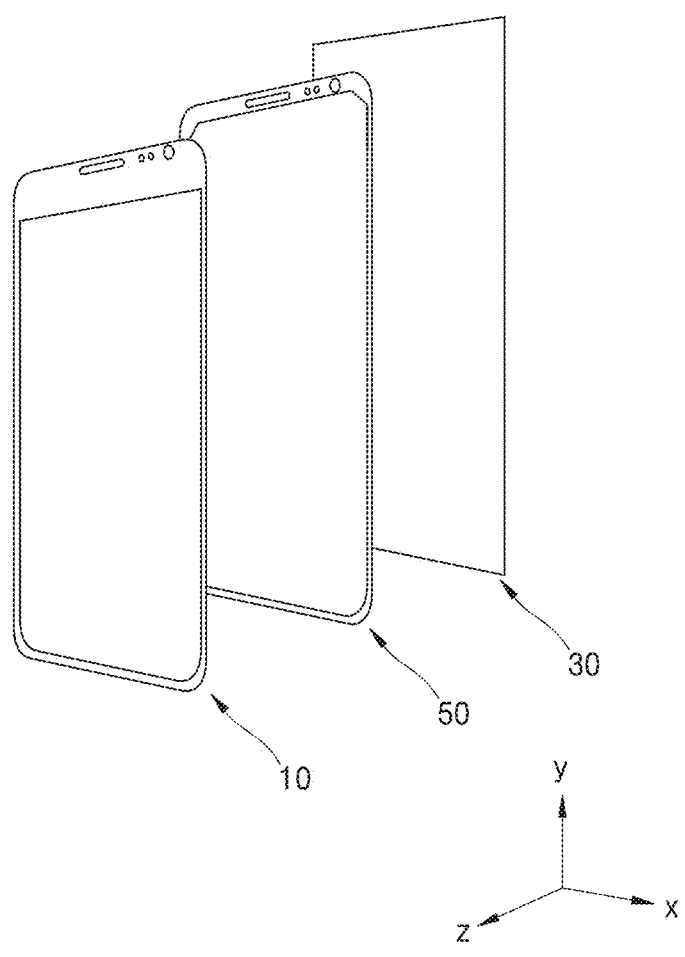
FIG. 2 is an exploded perspective view of a portion of the display apparatus of FIG. 1.
Figure 3:
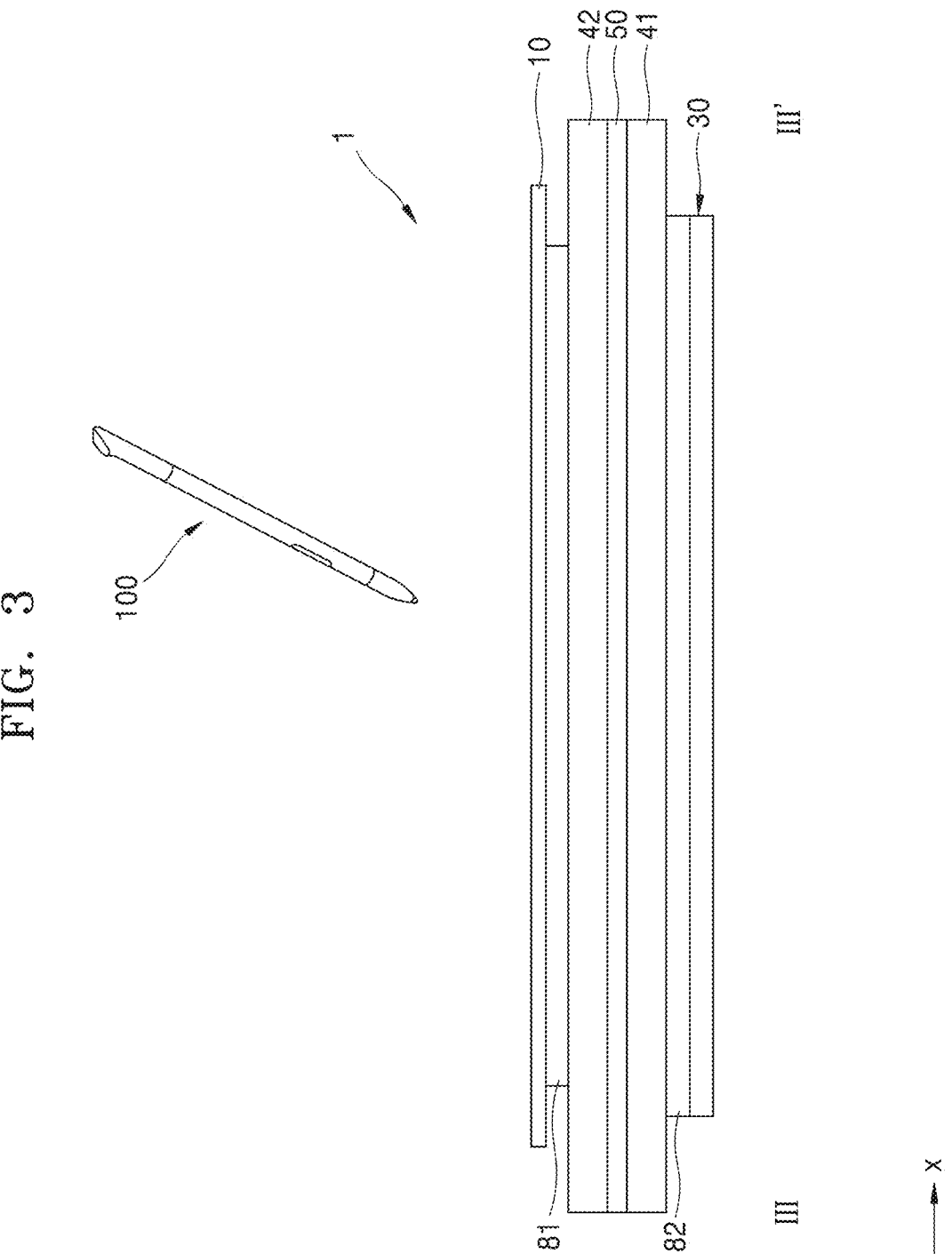
FIG. 3 is a schematic diagram of an input unit and a schematic cross-sectional view of the display panel taken along the line III-III' of FIG. 1.

FIG. 1 is a schematic perspective view of a display apparatus 1 according to an embodiment. FIG. 2 is an exploded perspective view of a portion of the display apparatus 1 of FIG. 1. FIG. 3 is a schematic diagram of an input unit 100 and a schematic cross-sectional view of the display apparatus 1 taken along the line III-III' of FIG. 1. In FIG. 3, an input unit (e.g., an input device) 100 is also illustrated for convenience.

Referring to FIGS. 1 to 3, the display apparatus 1 is an apparatus that displays moving images and/or still images. The display apparatus 1 may be implemented as various suitable electronic apparatuses, for example, such as portable electronic devices (e.g., mobile phones, smartphones, tablet personal computers (PCs), mobile communication terminals, electronic organizers, electronic books, portable multimedia players (PMPs), navigation devices, or ultra mobile PCs (UMPCs)), as well as televisions, laptops, monitors, billboards, or Internet of things (IoT) devices. In addition, the display apparatus 1 may be a wearable device, such as a smart watch, a watch phone, a glasses-type display, or a head mounted display (HMD). Furthermore, the display apparatus 1 may be an instrument panel for vehicles, a center information display (CID) arranged on the center fascia or dashboard of vehicles, a room mirror display in lieu of a side-view mirror of vehicles, or a display arranged at the rear side of a front seat as entertainment for a rear seat of vehicles. FIGS. 1 and 2 illustrate a case where the display apparatus 1 is a smartphone as a representative example.

The display apparatus 1 may include a cover member 10, a display panel 50, and a digitizer 30. The display apparatus 1 may further include a display circuit board, a main circuit board, a heat dissipation plate, a battery, a lower cover, and/or a housing 90.

The display apparatus 1 may appear to have a rectangular or an approximately rectangular shape in a plan view. For example, in a plan view when viewed in the z-axis direction, the display apparatus 1 may appear to have a rectangular or an approximately rectangular shape with a short side extending in a first direction (e.g., the x-axis direction) and a long side extending in a second direction (e.g., the y-axis direction), as shown in FIG. 1. A corner where the short side extending in the first direction (e.g., the x-axis direction) meets the long side extending in the second direction (e.g., the y-axis direction) may have a rounded shape to have a curvature (e.g., a certain or predetermined curvature) or a right-angled shape. However, the present disclosure is not limited thereto, and the display apparatus 1 may have a different polygonal shape, an elliptical shape, or a circular shape in a plan view.

The display apparatus 1 may have a display region DA, and a non-display region NDA surrounding (e.g., around a periphery of) the display region DA. The display region DA may refer to a region where an image is displayed, and the non-display region NDA may refer to a region where an image is not displayed.

The cover member 10 may be disposed above the display panel 50 (e.g., in a +z direction) to cover the upper surface of the display panel 50. The cover member 10 may protect the upper surface of the display panel 50. The cover member 10 may be entirely formed of a light-transmissive material. For example, the cover member 10 may include glass or a transparent synthetic resin. The cover member 10 may have a single-layer structure or a multilayered structure.

The display panel 50 may be disposed under the cover member 10. The display panel 50 may be arranged to overlap with the cover member 10.

The display panel 50 may be a light-emitting display panel including a light-emitting element. For example, the display panel 50 may be an organic light-emitting display panel that uses organic light-emitting diodes, a micro light-emitting diode display panel that uses micro light-emitting diodes (micro LEDs), an inorganic light-emitting display panel that uses inorganic light-emitting elements, or a quantum dot display panel including quantum dots.

The display panel 50 may be a rigid display panel having a stiffness that prevents it from easy bending, or may be a flexible display panel that may be easily bent, folded, or rolled due to its flexibility. For example, the display panel 50 may be a foldable display panel that may be folded and unfolded, a curved display panel in which the display region DA is curved, a bent display panel in which regions other than the display region DA are bent, a rollable display panel that may be rolled or unrolled, or a stretchable display panel that may be stretched.

A flexible printed circuit board, which is a display circuit board, may be attached to one edge of the display panel 50. The flexible printed circuit board may be electrically connected to a pad located at one edge of the display panel 50 via an anisotropic conductive film. A display controller 57 (e.g., see FIG. 4) that applies various electrical signals to the display panel 50 may be disposed on the flexible printed circuit board.

The display apparatus 1, which is an electronic apparatus such as a mobile phone, may include a main circuit board to control various components of the display apparatus 1. The flexible printed circuit board may be electrically connected to the main circuit board via an anisotropic conductive film or a connector. A main controller that controls the display apparatus 1 and a main processor to process various data may be disposed on the main circuit board. In some embodiments, the display controller 57 may be integrated with the main controller. In addition, a touch sensor driver that drives a touch screen layer may be disposed on the main circuit board.

The display panel 50 may include a touch screen layer. The touch screen layer may sense a user's touch input by using at least one of various suitable touch manners, such as a resistive manner or a capacitive manner. For example, when the touch screen layer of the display panel 50 senses a user's touch input in a capacitive manner, the main controller or the like may apply driving signals to driving electrodes from among touch electrodes included in the touch screen layer, and may sense, via the sensing electrodes from among the touch electrodes, a voltage due to a mutual capacitance between the driving electrodes and the sensing electrodes. Thus, the main controller or the like may determine whether the user has touched the display panel. The touch sensor driver may transmit data about the sensed voltage or sensor data, which is processed data of the sensed voltage, to the main processor, and the main processor may analyze the sensor data to calculate touch coordinates where the touch input has occurred.

The display panel 50 may include a substrate, transistors disposed on the substrate, and display elements. The display panel 50 may also include a touch screen layer as described above. An optical functional layer 42 may be disposed above the display panel 50, and a panel protection member 41 may be disposed below (e.g., under) the display panel 50.

The substrate included in the display panel 50 may include an insulating material, such as glass, quartz, or a polymer resin. The substrate may be a rigid substrate or a flexible substrate, for example, that is bendable, foldable, or rollable. For example, the substrate may include a polymer resin, such as polyethersulfone, polyacrylate, polyetherimide, polyethylene naphthalate, polyethylene terephthalate, polyphenylene sulfide, polyarylate, polyimide, polycarbonate, or cellulose acetate propionate. The substrate may have a multilayered structure including a layer including a polymer resin, and an inorganic layer. For example, the substrate may include two layers including a polymer resin, and an inorganic barrier layer arranged therebetween.

A display element located within the display region DA, a transistor constituting a pixel circuit for driving the display element, and the like may be disposed on the substrate. An encapsulation layer or the like may cover and protect the display elements. A scan driver, a data driver, or the like located in the non-display region NDA may also be disposed on the substrate.

The optical functional layer 42 located on the display panel 50 may include a reflection prevention layer. The reflection prevention layer may reduce a reflectance of light (e.g., external light) incident on the display apparatus 1 from the outside.

For example, the reflection prevention layer may include a polarizing film. The polarizing film may include a retarder film, such as a linear polarizer and/or a quarter-wavelength (λ/4) plate. As another example, the reflection prevention layer may include a black matrix, and a color filter layer including color filters. The color filters may be arranged in consideration of a color of light emitted from each pixel of the display apparatus 1. For example, the color filter layer may include a red color filter, a green color filter, or a blue color filter. As another example, the reflection prevention layer may include a destructive interference structure. The destructive interference structure may include a first reflective layer and a second reflective layer, which are disposed at (e.g., in or on) different layers from each other. A first reflected ray and a second reflected ray reflected from the first reflective layer and the second reflective layer, respectively, may be destructively interfered with, and accordingly, external light reflectance may be reduced.

An optically transparent adhesive (OCA) 81 may be arranged between the optical functional layer 42 and the cover member 10.

The panel protection member 41 disposed below the display panel 50 may be attached to the display panel 50 via an adhesive member. The adhesive member may be a pressure-sensitive adhesive (PSA) member. The panel protection member 41 may include a light absorption layer for absorbing light incident from the outside, a cushion layer for absorbing shock from the outside, and/or a heat dissipation layer for efficiently dissipating heat of the display panel 50. The light absorption layer may block transmission of light to prevent or substantially prevent the components disposed under the light absorption layer, for example, such as the flexible printed circuit board or a main printed circuit board, from being visible from the upper portion of the display panel 50. The light absorption layer may include a light absorption material, such as a black pigment or a black dye.

The digitizer 30 may be disposed under the display panel 50. By including a pattern layer, the digitizer 30 may transmit an electrical signal to the input unit 100, such as an external stylus or pen, or may sense a signal input from the input unit 100. In more detail, the digitizer 30 may sense an intensity and/or a direction of a signal input from the input unit 100. The digitizer 30 may be electrically connected to the main circuit board. The digitizer 30 may be attached to the display panel 50 via an adhesive layer 82. The adhesive layer 82 may be, for example, a PSA.

In addition, the display apparatus may further include various components that are not shown in the drawings, for example, such as the display circuit board and the main circuit board, as described above, and may further include a bracket, a heat dissipation plate, a battery, a camera, a wireless communication module, a memory, various sensors, and/or a lower cover.

Figure 4:
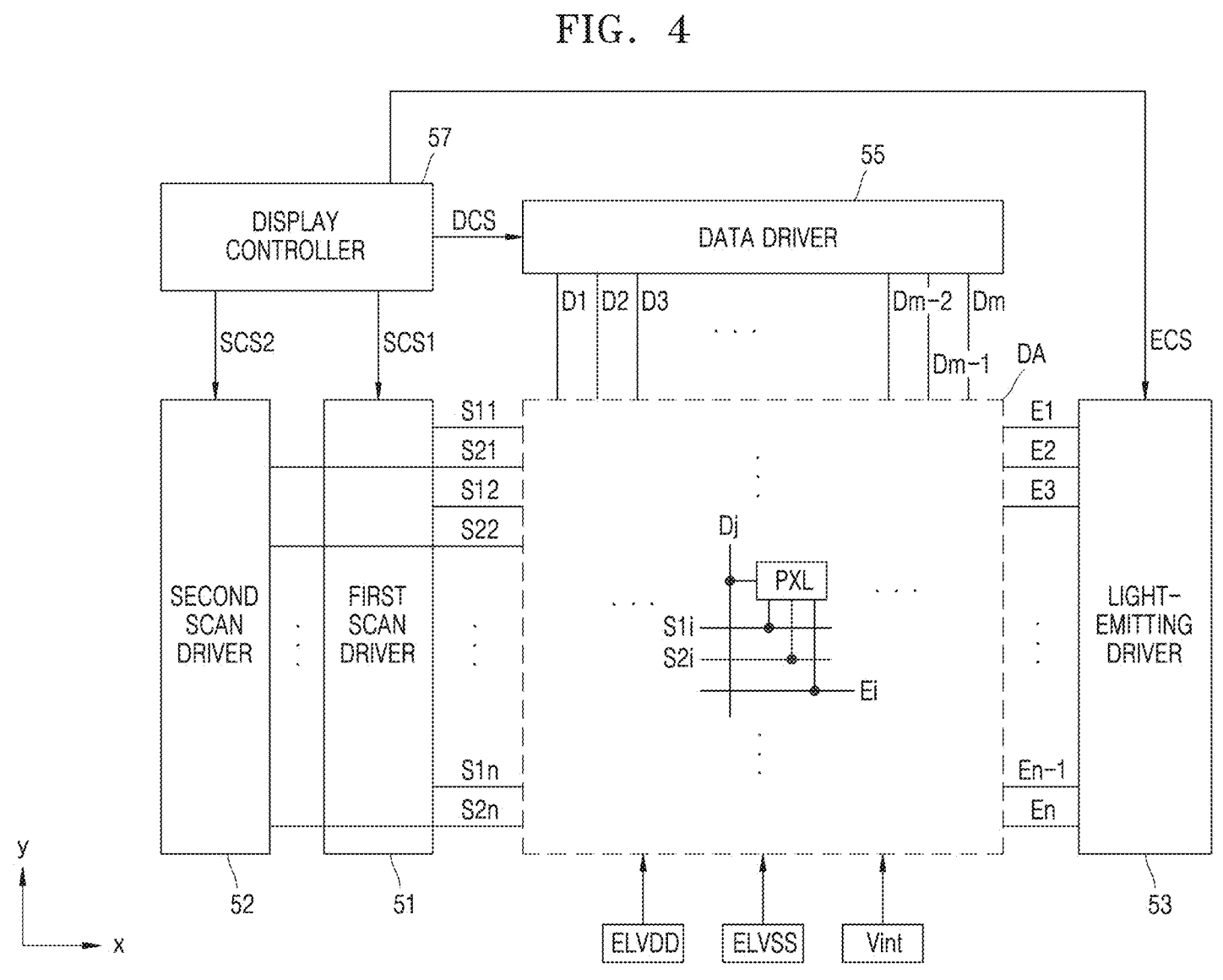

FIG. 4 is a schematic diagram of a configuration of the display apparatus of FIG. 1. Referring to FIG. 4, the display apparatus according to the present embodiment may include the display region DA, a first scan driver 51, a second scan driver 52, a light-emitting driver 53, a data driver 55, and the display controller 57.

The display controller 57 may be integrated with the main controller that controls the display apparatus 1, as described above. When the display controller 57 is separated from the main controller, the display controller 57 may receive image data (RGB) and timing signals (e.g., Vsync, Hsync, DE, and CLK) from the main controller located on the main circuit board. The display controller 57 may generate first and second scan driving control signals SCS1 and SCS2, a data driving control signal DCS, and a light-emitting driving control signal ECS, based on the image data (RGB) and the timing signals (e.g., Vsync, Hsync, DE, and CLK). The first and second scan driving control signals SCS1 and SCS2 generated by the display controller 57 may be supplied to the first scan driver 51 and the second scan driver 52. The data driving control signal DCS may be supplied to the data driver 55. The light-emitting driving control signal ECS may be supplied to the light-emitting driver 53. In addition, the display controller 57 may rearrange the image data (RGB), and supply the rearranged image data (RGB) to the data driver 55.

The first and second scan driving control signals SCS1 and SCS2 may include at least one clock signal, and a start pulse.

The start pulse may include a first start pulse and a second start pulse. The first start pulse may control an output timing of a first scan signal that is first output from the first scan driver 51. In addition, the second start pulse may control an output timing of a second scan signal that is first output from the second scan driver 52. A clock signal may be used to shift the start pulse.

The light-emitting driving control signal ECS may also include at least one clock signal, and a start pulse.

The data driving control signal DCS may include a source start pulse and clock signals. The source start pulse may be used to control a start point of data sampling, and the clock signals may be used to control a sampling operation.

The first scan driver 51 may supply the first scan signal to first scan lines S11, S12, . . . , and S1n in correspondence with the first scan driving control signal SCS1, where n is a natural number of two or more. For example, the first scan driver 51 may sequentially supply the first scan signal to the first scan lines S11, S12, . . . , and S1n. When the first scan signal is sequentially supplied to the first scan lines S11, S12, . . . , and S1n, pixels PXL may be selected on a horizontal line basis. For example, within the display region DA, n rows extending in the x-axis direction may be sequentially arranged from a first row to an $n^{th}$ row along the y-axis direction, and m pixels may be defined as being arranged in each row, where m is a natural number of two or more. Thus, when the first scan signal is sequentially supplied to the first scan lines S11, S12, . . . , and S1n, the first row to the $n^{th}$ row may be sequentially selected. As such, the first scan signal may have (e.g., may be set to) a gate-on voltage (e.g., a low-potential (or low-level) voltage) that allows turning on of switching transistors included in the m pixels PXL located in one row.

The second scan driver 52 may supply the second scan signal to second scan lines S21, S22, . . . , and S2n in correspondence with the second scan driving control signal SCS2. For example, the second scan driver 52 may sequentially supply the second scan signal to the second scan lines S21, S22, . . . , and S2n. The second scan signal may have (e.g., may be set to) a gate-on voltage (e.g., a high-potential (or high-level) voltage) that allows turning on of compensation transistors included in the pixels PXL.

The first scan driver 51 and the second scan driver 52 may be integrated with each other into one scan driver.

The data driver 55 may supply a data signal to data lines D1, D2, . . . , and Dm in correspondence with the data driving control signal DCS. The data signal supplied to the data lines D1, D2, . . . , and Dm may be supplied to pixels PXL located in a row selected by the first scan signal. As such, the data driver 55 may supply the data signal to the data lines D1, D2, . . . , and Dm so as to be synchronized with the first scan signal.

The light-emitting driver 53 may supply a light-emitting control signal to light-emitting control lines E1, E2, . . . , and En in correspondence with the light-emitting driving control signal ECS. For example, the light-emitting driver 53 may sequentially supply the light-emitting control signal to the light-emitting control lines E1, E2, . . . , and En. When the light-emitting control signal is sequentially supplied to the light-emitting control lines E1, E2, . . . , and En, the pixels PXL may emit light on a horizontal line basis. As such, the light-emitting control signal may have (e.g., may be set to) a gate-on voltage (e.g., a low-potential (or low-level) voltage) to allow turning on of light-emitting control transistors included in the pixels PXL. As necessary or desired, the light-emitting control signal (e.g., the potential or level of voltage thereof) may be reversed to allow the pixels PXL to be in a non-emission state on a horizontal line basis when the light-emitting control signal is sequentially supplied to the light-emitting control lines E1, E2, . . . , and En. In this case, the light-emitting control signal may have (e.g., may be set to) a gate-off voltage (e.g., a high-potential (or high-level) voltage) to allow turning off of the light-emitting control transistors included in the pixels PXL. Hereinafter, for convenience of illustration, when the light-emitting control signal is sequentially supplied to the light-emitting control lines E1, E2, . . . , and En, it is assumed that the pixels PXL emit light on a horizontal line basis.

FIG. 4 illustrates that the first scan driver 51 and the second scan driver 52 are separate from the light-emitting driver 53, but the present disclosure is not limited thereto. For example, the first scan driver 51, the second scan driver 52, and the light-emitting driver 53 may be integrated into one (e.g., the same) driver. In addition, the first scan driver 51, the second scan driver 52, and/or the light-emitting driver 53 may be concurrently or substantially simultaneously formed with each other of the same material when the transistors for the pixel circuit are formed in the display region DA. Each of the first scan driver 51 and the second scan driver 52 may be formed to have a shape extending in the y-axis direction on one side of the display region DA, and the light-emitting driver 53 may be formed to have a shape extending in the y-axis direction on another side (e.g., an opposite side) of the display region DA.

A plurality of pixels PXL that are electrically connected to the data lines D1, D2, . . . , and Dm, the first scan lines S11, S12, . . . , and S1n, the second scan lines S21, S22, . . . , and S2n, and the light-emitting control lines E1, E2, . . . , and En may be arranged in the display region DA. The pixels PXL may be electrically connected to an initialization power source Vint, a first power source ELVDD, and a second power source ELVSS from the outside.

Each of the pixels PXL may receive the data signal from an electrically connected corresponding one from among the data lines D1, D2, . . . , and Dm when a scan signal is applied from an electrically connected corresponding one from among the first scan lines S11, S12, . . . , and S1n. A pixel PXL that receives the data signal may control an amount of current flowing from the first power source ELVDD to the second power source ELVSS via an organic light-emitting diode in correspondence with the data signal. Accordingly, light having a luminance corresponding to the amount of current may be generated from the organic light-emitting diode included in the corresponding pixel PXL. For reference, a voltage of the first power source ELVDD may be (e.g., set to be) higher than a voltage of the second power source ELVSS.

FIG. 4 illustrates that a pixel PXL in a $j^{th}$ column and located in an $i^{th}$ row is electrically connected to one first scan line S1$i$ (also referred to as a n $i^{th}$ first scane line S1$i$), one second scan line S2$i$ (also referred to as an $i^{th}$ second scane line S2$i$), one data line Dj (also referred to as a $i^{th}$ data line Dj, and one light-emitting control line Ei (also referred to as an $i^{th}$ light-emitting control line Ei). However, the present disclosure is not limited thereto, and signal lines electrically connected to the pixel PXL may be variously modified in correspondence with a circuit structure of the pixel PXL.

Figure 5:
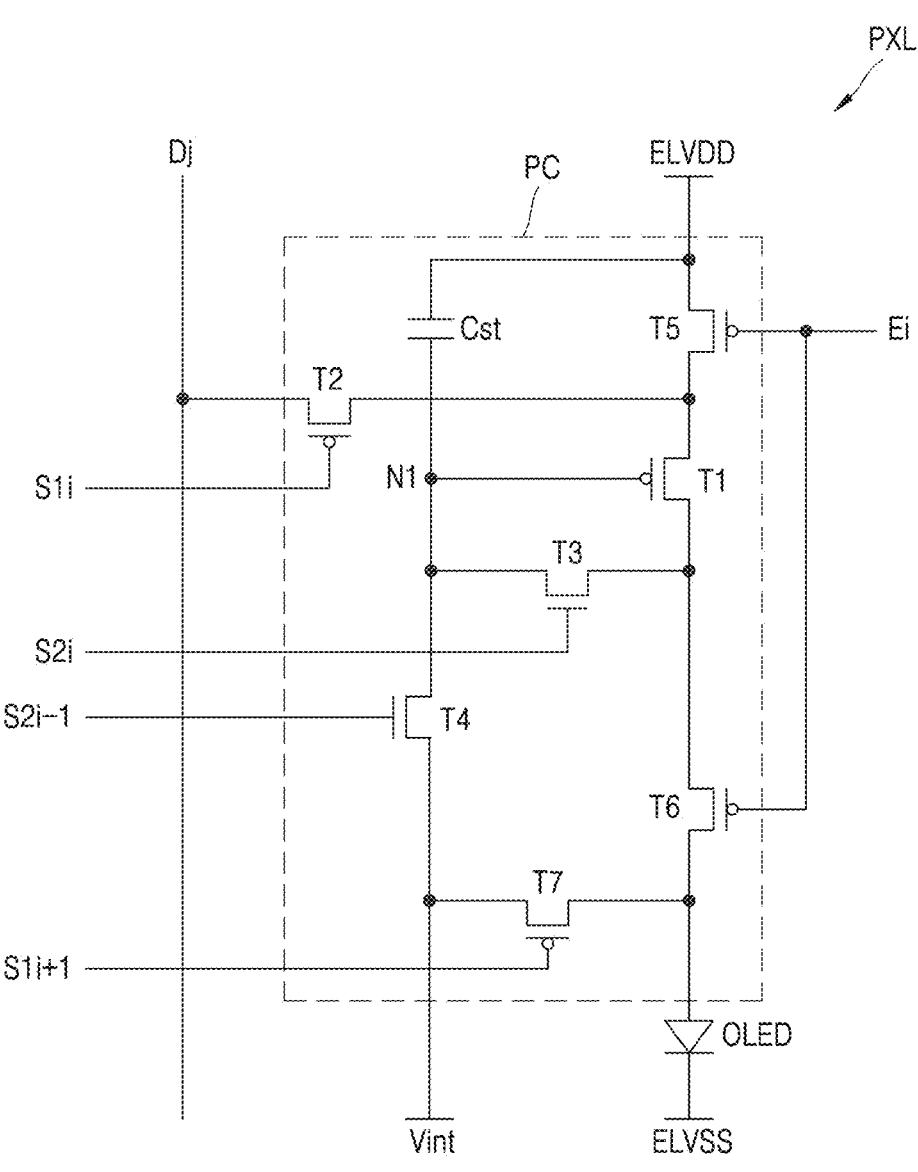
FIG. 5 is an equivalent circuit diagram of one pixel included in the display apparatus of FIG. 4.

FIG. 5 is an equivalent circuit diagram of one pixel included in the display apparatus of FIG. 4. For convenience of illustration, FIG. 5 shows an equivalent circuit diagram of a pixel PXL that is located in the $i^{th}$ row and electrically connected to a $j^{th}$ data line Dj.

As shown in FIG. 5, the pixel PXL may include an organic light-emitting diode OLED, and a pixel circuit PC for controlling the amount of current supplied to the organic light-emitting diode OLED.

A pixel electrode (e.g., an anode electrode) of the organic light-emitting diode OLED may be electrically connected to the pixel circuit PC, and a common electrode (e.g., a cathode electrode) may be electrically connected to the second power source ELVSS. The organic light-emitting diode OLED may generate light having a desired luminance (e.g., a certain or predetermined luminance) in correspondence with the amount of current supplied from the pixel circuit PC.

The pixel circuit PC may control the amount of current flowing from the first power source ELVDD to the second power source ELVSS via the organic light-emitting diode OLED in correspondence with the data signal. As such, the pixel circuit PC may include a first transistor T1 to a seventh transistor T7, and a storage capacitor Cst.

Each of the first transistor T1, the second transistor T2, the fifth transistor T5, the sixth transistor T6, and the seventh transistor T7 may be a P-type transistor. Accordingly, a gate-on voltage of each of these transistors may be a low-potential (e.g., a low-level) voltage. For example, these transistors may include a polysilicon layer. Each of the third transistor T3 and the fourth transistor T4 may be an N-type transistor. Accordingly, a gate-on voltage of each of these transistors may be a high-potential (e.g., a high-level) voltage. For example, these transistors may include an oxide semiconductor layer.

During a manufacturing process, the oxide semiconductor layer may be formed via a low-temperature process, and the oxide semiconductor layer has a lower charge mobility than that of the polysilicon layer. In other words, a thin-film transistor including an oxide semiconductor layer may have excellent off-current characteristics. Therefore, because the third transistor T3 and the fourth transistor T4 may include an oxide semiconductor layer, a leakage current from a first node N1 may be minimized or reduced, thereby improving a display quality.

However, the present disclosure is not limited thereto, and the types of the transistors may be various modified as needed or desired. Hereinafter, for convenience, a case where each of the first transistor T1, the second transistor T2, the fifth transistor T5, the sixth transistor T6, and the seventh transistor T7 is a P-type transistor, and each of the third transistor T3 and the fourth transistor T4 is an N-type transistor, is described in more detail.

The seventh transistor T7 may electrically connect the initialization power source Vint to the pixel electrode of the organic light-emitting diode OLED. A gate electrode of the seventh transistor T7 may be electrically connected to an $(i+1)^{th}$ first scan line S1$i$+1. The seventh transistor T7 may be turned on when the first scan signal is supplied to the $(i+1)^{th}$ first scan line S1$i$+1, and may apply the voltage of the initialization power source Vint to the pixel electrode of the organic light-emitting diode OLED. As such, the seventh transistor T7 may be referred to as a first initialization transistor. The initialization power source Vint may have (e.g., may be set to) a lower voltage than that of the data signal.

The sixth transistor T6 may electrically connect the first transistor T1 to the organic light-emitting diode OLED. A gate electrode of the sixth transistor T6 may be electrically connected to an $i^{th}$ light-emitting control line Ei. The sixth transistor T6 may be turned on when the light-emitting control signal is supplied to the $i^{th}$ light-emitting control line Ei, and may be turned off in other cases. When the sixth transistor T6 is turned on, a current may flow to the organic light-emitting diode OLED, thereby allowing the organic light-emitting diode OLED to emit light. As such, the sixth transistor T6 may be referred to as a light-emitting control transistor.

The fifth transistor T5 may electrically connect the first power source ELVDD to the first transistor T1. A gate electrode of the fifth transistor T5 may be electrically connected to the $i^{th}$ light-emitting control line Ei. The fifth transistor T5 may be turned on when the light-emitting control signal is supplied to the $i^{th}$ light-emitting control line Ei, and may be turned off in other cases. When the fifth transistor T5 is turned on, a current may flow from the first power source ELVDD to the organic light-emitting diode OLED via the first transistor T1, thereby allowing the organic light-emitting diode OLED to emit light. The fifth transistor T5 may be referred to as an operation control transistor.

A first electrode of the first transistor T1 may be electrically connected to the first power source ELVDD via the fifth transistor T5, and a second electrode of the first transistor T1 may be electrically connected to the pixel electrode of the organic light-emitting diode OLED via the sixth transistor T6. A gate electrode of the first transistor T1 may be electrically connected to the first node N1. The first transistor T1 may control the luminance of light generated from the organic light-emitting diode OLED, by controlling the amount of current flowing from the first power source ELVDD to the second power source ELVSS via the organic light-emitting diode OLED, in correspondence with the voltage of the first node N1, or in other words, the voltage of the gate electrode of the first transistor T1. As such, the first transistor T1 may be referred to as a driving transistor.

The third transistor T3 may electrically connect the second electrode of the first transistor T1 to the first node N1. A gate electrode of the third transistor T3 may be electrically connected to an $i^{th}$ second scan line S2$i$. The third transistor T3 may be turned on when the second scan signal is supplied to the $i^{th}$ second scan line S2$i$, and may electrically connect the second electrode of the first transistor T1 to the first node N1. In other words, when the third transistor T3 is turned on, the first transistor T1 may be in a diode-connected state. The third transistor T3 may be referred to as a compensation transistor, because the third transistor T3 compensates for the threshold voltage of the first transistor T1.

The fourth transistor T4 may electrically connect the first node N1 to the initialization power source Vint. A gate electrode of the fourth transistor T4 may be electrically connected to an $(i-1)^{th}$ second scan line S2$i$−1. The fourth transistor T4 may be turned on when the second scan signal is supplied to the $(i-1)^{th}$ second scan line S2$i$−1, and may supply the voltage of the initialization power source Vint to the first node N1. As such, the fourth transistor T4 may be referred to as a second initialization transistor.

The second transistor T2 may electrically connect the $j^{th}$ data line Dj to the first electrode of the first transistor T1. A gate electrode of the second transistor T2 may be electrically connected to an $i^{th}$ first scan line S1$i$. The second transistor T2 may be turned on when the first scan signal is supplied to the $i^{th}$ first scan line S1$i$, and may electrically connect the $j^{th}$ data line Dj to the first electrode of the first transistor T1. The second transistor T2 may be referred to as a switching transistor.

The storage capacitor Cst may electrically connect the first power source ELVDD to the first node N1. The storage capacitor Cst may store charges corresponding to the voltage of the data signal and the threshold voltage of the first transistor T1.

Figure 6:
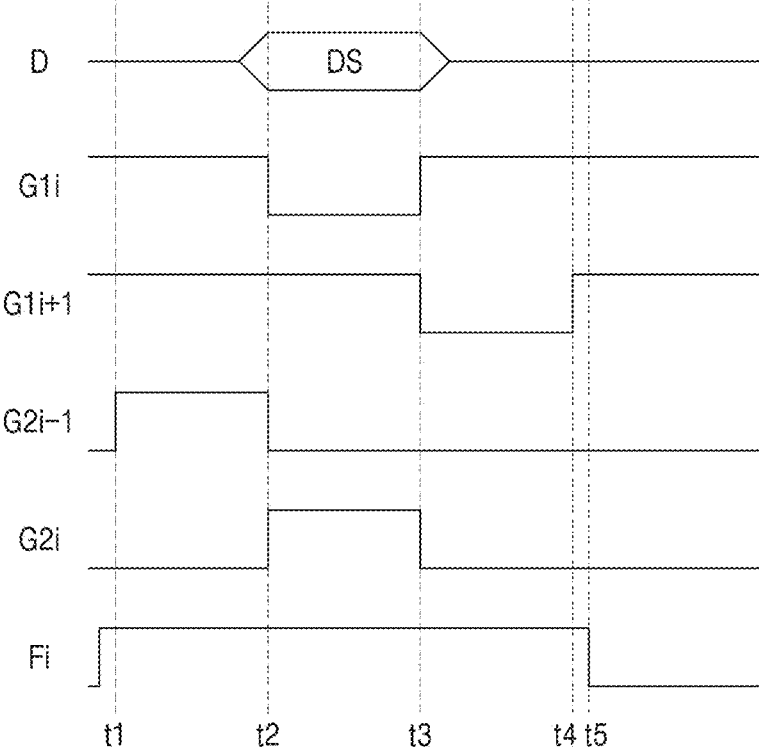
FIG. 6 is a waveform diagram illustrating a driving method of the equivalent circuit of FIG. 5.

FIG. 6 is a waveform diagram illustrating a driving method of the equivalent circuit of FIG. 5. For reference, as described above, the first transistor T1, the second transistor T2, the fifth transistor T5, the sixth transistor T6, and the seventh transistor T7, which are P-type transistors, may be turned on when a low-potential (e.g., a low-level) voltage is applied to their gate electrodes. The third transistor T3 and the fourth transistor T4, which are N-type transistors, may be turned on when a high-potential (e.g., a high-level) voltage is applied to their gate electrodes. As such, the first scan signal may be (e.g., may be set to) a low-potential (e.g., a low-level) voltage, and the second scan signal may be (e.g., may be set to) a high-potential (e.g., a high-level) voltage.

First, before a time point t1, the supply of a light-emitting control signal Fi, which is a low-potential (e.g., a low-level) voltage, to the $i^{th}$ light-emitting control line Ei is interrupted. Accordingly, the fifth transistor T5 and the sixth transistor T6 may be turned off, and thus, the pixel PXL may be in (e.g., may be set to) a non-emission state.

Afterwards, at the time point t1, a second scan signal G2$i$−1 is supplied to the $(i−1)^{th}$ second scan line S2$i$−1. When the second scan signal G2$i$−1 is supplied, the fourth transistor T4 is turned on, such that the voltage of the initialization power source Vint is supplied to the first node N1, and thus, the first node N1 may be initialized to the voltage of the initialization power source Vint.

When the first node N1 is initialized to the voltage of the initialization power source Vint, at a time point t2, the supply of the second scan signal G2$i$−1 to the $(i−1)^{th}$ second scan line S2$i$−1 is interrupted. A second scan signal G2$i$ is supplied to the $i^{th}$ second scan line S2$i$, and similarly, a first scan signal G1$i$ is supplied to the $i^{th}$ first scan line S1$i$. Accordingly, the third transistor T3 is turned on, such that the first transistor T1 is in a diode-connected state (e.g., is diode-connected), and the second transistor T2 is turned on, such that a data signal DS, which is included in a data signal D from the $j^{th}$ data line Dj and is related to an image to be displayed, is supplied to the first electrode of the first transistor T1. At this time, because the first node N1 has been initialized to the voltage of the initialization power source Vint, which is lower than the potential (or voltage) of the data signal DS, the first transistor T1 may be turned on. Therefore, the data signal DS supplied to the first electrode of the first transistor T1 which is in the diode-connected state, is supplied to the first node N1 via the third transistor T3. Then, a voltage obtained by subtracting a threshold voltage ($V_{th}$) of the first transistor T1 from the data signal DS is applied to the first node N1. Accordingly, the storage capacitor Cst may store charges corresponding to a difference between the voltage obtained by subtracting the threshold voltage ($V_{th}$) of the first transistor T1 from the data signal DS and the potential (or voltage) of the first power source ELVDD.

Next, at a time point t3, the supply of the second scan signal G2$i$ to the $i^{th}$ second scan line S2$i$ and the supply of the first scan signal G1$i$ to the $i^{th}$ first scan line S1$i$ are interrupted, and a first scan signal G1$i$+1 is supplied to the $(i+1)^{th}$ first scan line S1$i$+1. Accordingly, the seventh transistor T7 is turned on, such that the voltage of the initialization power source Vint is supplied to the pixel electrode of the organic light-emitting diode OLED. Therefore, a parasitic capacitor formed in the organic light-emitting diode OLED is discharged, and accordingly, the display may represent a real black image.

Afterwards, at a time point t4, the supply of the first scan signal G1$i$+1 to the $(i+1)^{th}$ first scan line S1$i$+1 is interrupted, and at a time point t5, the light-emitting control signal Fi is supplied to the $i^{th}$ light-emitting control line Ei. Accordingly, the fifth transistor T5 and the sixth transistor T6 are turned on, such that a current path is formed from the first power source ELVDD to the second power source ELVSS via the fifth transistor T5, the first transistor T1, the sixth transistor T6, and the organic light-emitting diode OLED. At this time, the first transistor T1 controls the amount of current flowing from the first power source ELVDD to the second power source ELVSS via the organic light-emitting diode OLED in correspondence with the voltage of the first node N1. Accordingly, the organic light-emitting diode OLED generates light having a desired luminance (e.g., a certain or predetermined luminance) in correspondence with the amount of current supplied from the first transistor T1.

The pixels PXL may generate light having a desired luminance (e.g., a certain or predetermined luminance) by repeating the above-described process.

For reference, the light-emitting control signal Fi supplied to the $i^{th}$ light-emitting control line Ei may be supplied so that the pixel PXL is in a non-emission state while the data signal DS is charged in the pixel PXL. However, the timing of the supply of the light-emitting control signal Fi may be variously modified as needed or desired.

Figure 7:
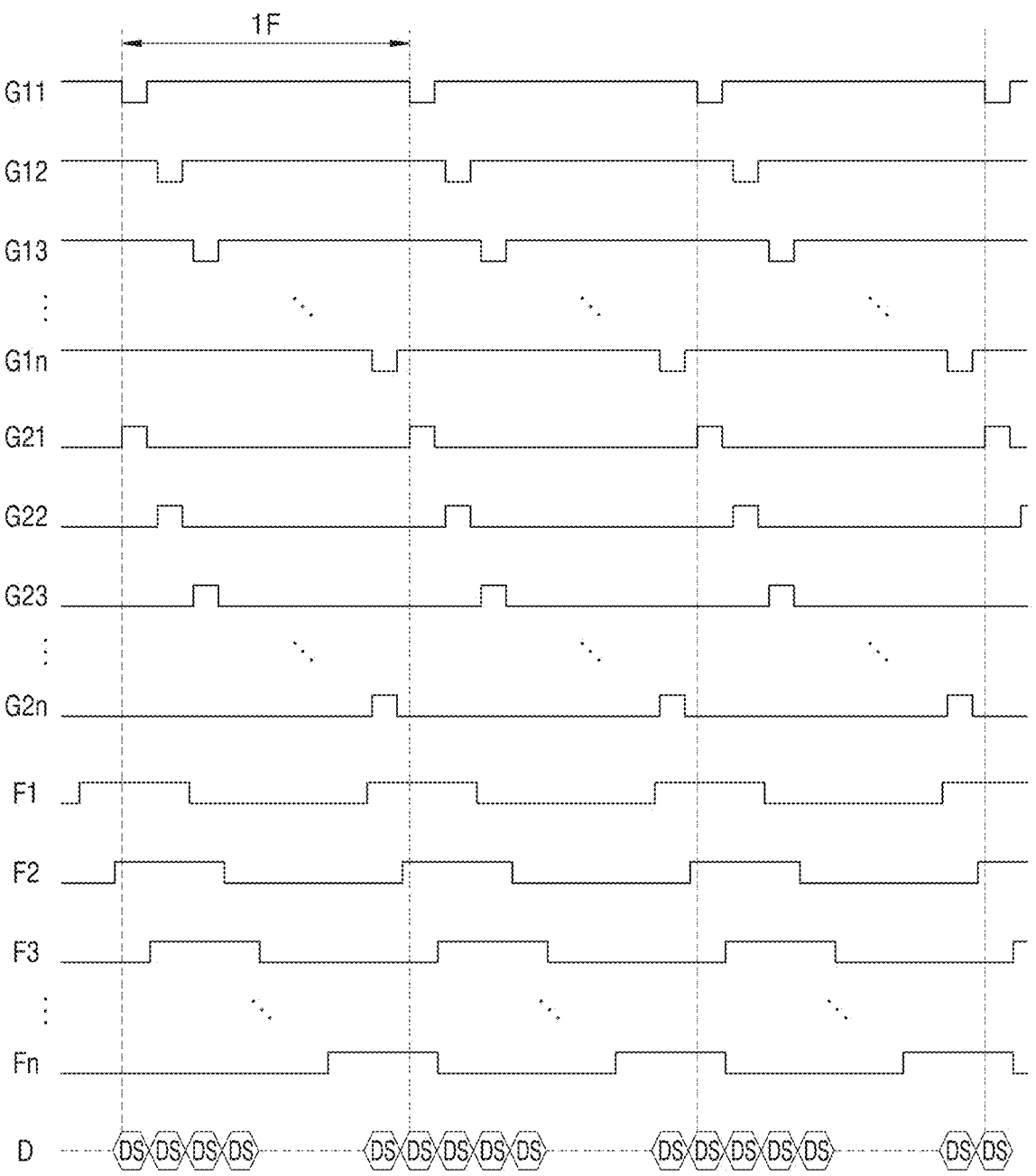
FIG. 7 is a waveform diagram illustrating a driving method of the display apparatus shown in FIG. 4.

FIG. 7 is a waveform diagram illustrating a driving method of the display apparatus shown in FIG. 4. Hereinafter, for convenience of illustration, the display apparatus is described as being driven at a driving frequency of 60 Hz. However, the present disclosure is not limited thereto, and the driving frequency may be 120 Hz, and in some embodiments, may be varied.

As shown in FIG. 7, during a first unit frame period 1F, first scan signals G11, G12, . . . , and G1$n$ may be sequentially supplied, and concurrently or substantially simultaneously, second scan signals G21, G22, . . . , and G2$n$ may be sequentially supplied. As such, the first unit frame period 1F may be repeated a number of times corresponding to the driving frequency during a unit period T. For example, the unit period T may be 1 second, and the first unit frame period 1F may be repeated 60 times for 1 second. The unit period T may be a time taken from when the first scan signal G11 is applied to the first row of the display region DA to when the first scan signal G11 is applied to the same first row a next time.

The first scan signals G11, G12, . . . , and G1$n$ may be supplied repeatedly in a cycle of the first unit frame period 1F. The second scan signals G21, G22, . . . , and G2$n$ may be supplied repeatedly in a cycle of the first unit frame period 1F. In addition, an $i^{th}$ first scan signal G1$i$ (also referred to as a first scan signal G1$i$) may overlap in time with an $i^{th}$ second scan signal G2$i$ (also referred to as a second scan signal G2$i$).

Light-emitting control signals F1, F2, . . . , and Fn may be sequentially supplied during the first unit frame period 1F, and may be supplied repeatedly in a cycle of the first unit frame period 1F.

The data signal DS may be supplied in synchronization with the first scan signals G11, G12, . . . , and G1$n$ and the second scan signals G21, G22, . . . , and G2$n$. Accordingly, as described above with reference to FIGS. 5 and 6, a voltage corresponding to the data signal DS may be stored in the pixels PXL. The pixels PXL may display an image (e.g., a certain or predetermined image) in the display region DA by generating light have a desired luminance (e.g., a certain or predetermined luminance) in correspondence with the data signal DS.

Figure 8:
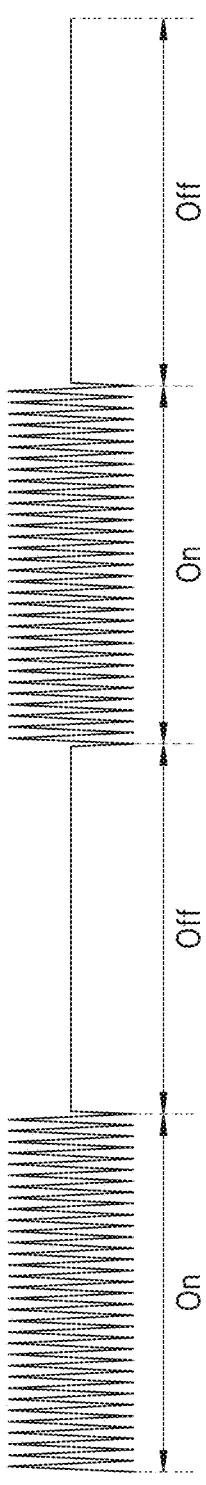
FIG. 8 is a waveform diagram illustrating a signal that the display apparatus of FIG. 1 transmits to an input unit.

As described above with reference to FIG. 3, by including a pattern layer, the digitizer 30 may transmit an electrical signal to the input unit 100, such as an external stylus or pen, or may sense a signal input from the input unit 100. FIG. 8 is a waveform diagram illustrating a signal that the display apparatus of FIG. 1 transmits to the input unit 100.

The digitizer 30 may transmit a charging signal to the input unit 100 according to a transmitting time slot (e.g., a preset time slot) On. In addition, the digitizer 30 may receive a position signal or the like from the input unit 100 without transmitting a charging signal during a receiving time slot (e.g., a preset time slot) Off. The transmitting time slots On and the receiving time slots Off may be periodically repeated.

When the digitizer 30 transmits a charging signal during the transmitting time slot On, the digitizer 30 may transmit an electromagnetic wave of a suitable frequency (e.g., a preset or predetermined frequency). The electromagnetic wave, or in other words, the charging signal, may be a signal having a sine wave waveform, for example. Accordingly, an induced current due to a resonance and/or an electromagnetic induction is generated in a charging coil provided in the input unit 100, and a capacitor or the like provided in the input unit 100 may be charged. The input unit 100 may allow a magnetic field to be generated by flowing a current through the charging coil during the receiving time slot Off, by using the power charged during the transmitting time slot On. Without transmitting a charging signal during the receiving time slot Off, the digitizer 30 may recognize the position of the input unit 100 by detecting the position of the magnetic field generated by the input unit 100, or in other words, by receiving a position signal from the input unit 100. In a case where the input unit 100 includes a switch, when a user clicks the switch, a change in magnetic field generated by the input unit 100 may occur, thereby allowing the digitizer 30 to sense an input through the switch.

Figure 9:
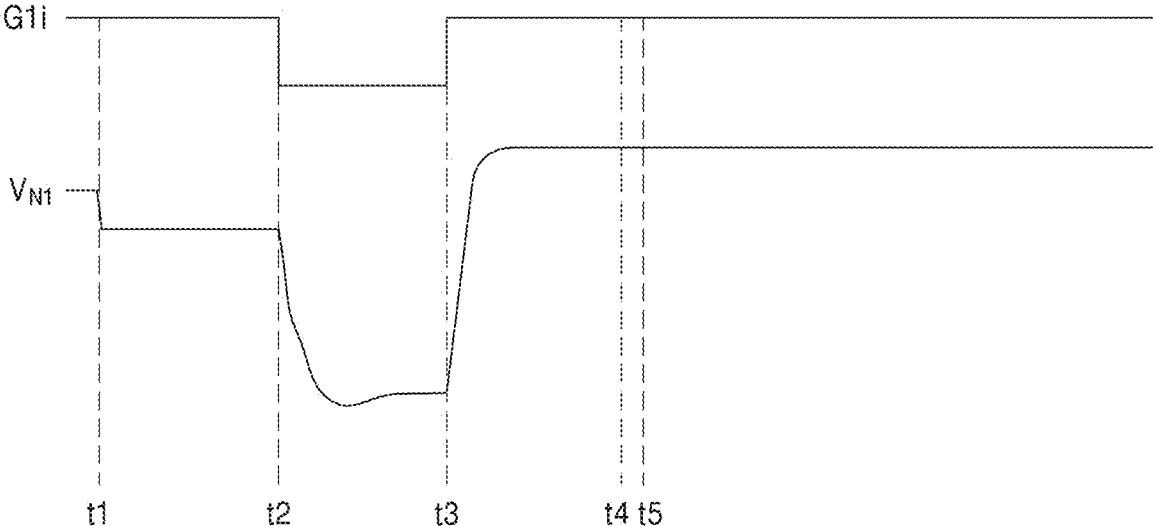
FIG. 9 is a waveform diagram showing a variation in a voltage of a gate electrode of a driving transistor of FIG. 5 when a charging signal that the display apparatus of FIG. 1 transmits to the input unit is in an off state.

FIG. 9 is a waveform diagram showing a variation in a voltage of the gate electrode of the driving transistor (e.g., the first transistor T1) of FIG. 5, or in other words, a voltage $V_{N1}$ of the first node N1, when a charging signal that the display apparatus 1 (e.g., the digitizer 30) of FIG. 1 transmits to the input unit 100 is in an off state, or in other words, during the receiving time slot Off of FIG. 8. As described above with reference to FIGS. 5 and 6, the first node N1 is initialized to the voltage of the initialization power source Vint at the time point t1. Afterwards, at the time point t2, the first scan signal G1$i$ is supplied to the $i^{th}$ first scan line S1$i$, such that a data signal begins to be supplied to the first transistor T1, and the supply of the data signal is completed at the time point t3. At this time, due to a kickback effect, the voltage $V_{N1}$ of the first node N1 rises, and a flow of a current corresponding to the increased potential may be formed after the time point t5, from the first power source ELVDD to the second power source ELVSS via the fifth transistor T5, the first transistor T1, the sixth transistor T6, and the organic light-emitting diode OLED. The increased potential varies depending on a data signal input to a corresponding pixel.

Figure 10:
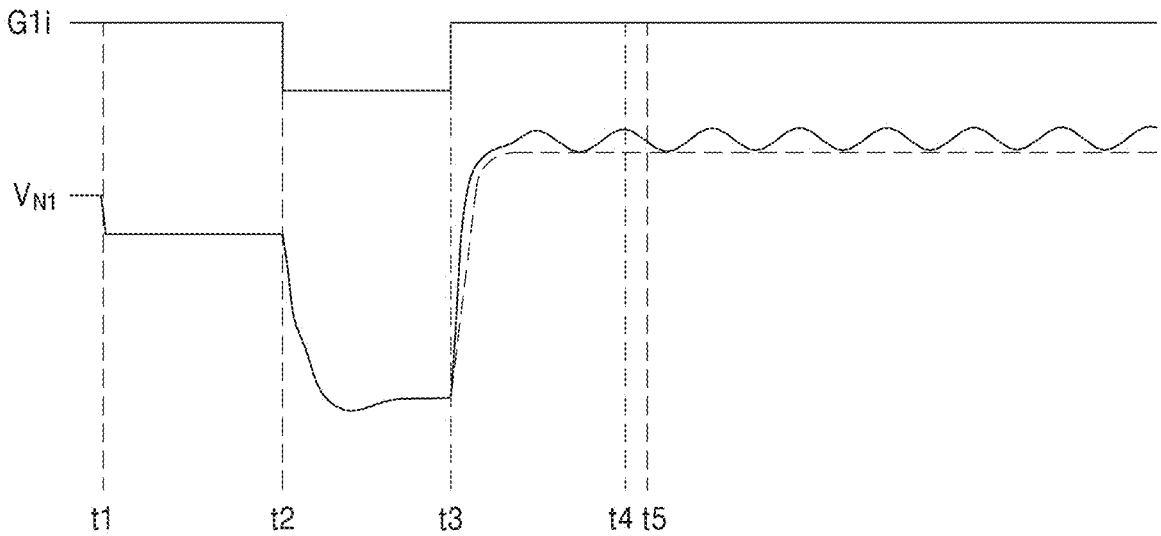
FIGS. 10 and 11 are waveform diagrams showing a variation in a voltage of the gate electrode of the driving transistor of FIG. 5 when a charging signal that the display apparatus of FIG. 1 transmits to the input unit is in an on state.
Figure 11:
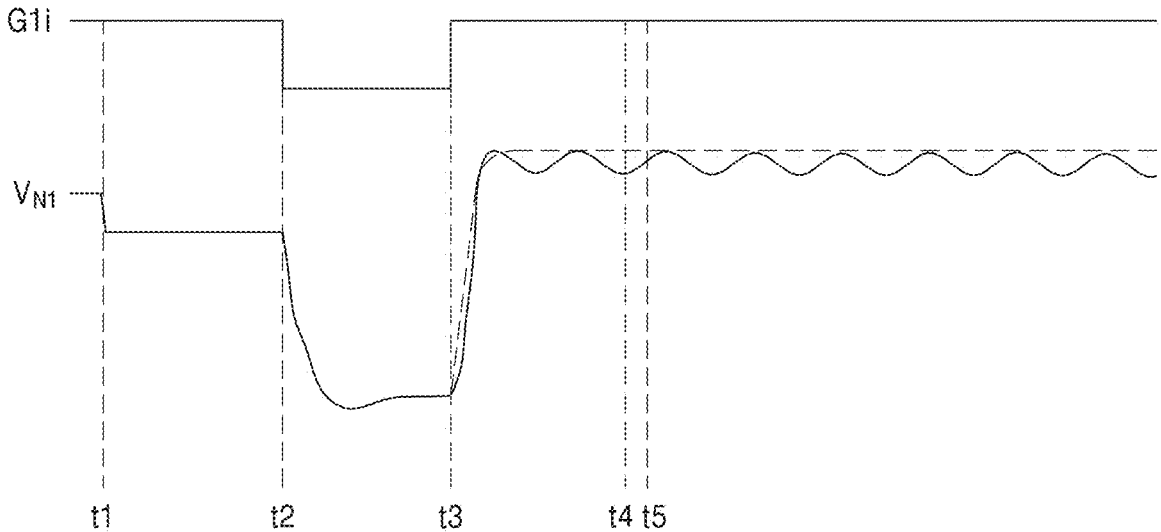

FIGS. 10 and 11 are waveform diagrams showing a variation in a voltage of the gate electrode of the first transistor T1, which is the driving transistor of FIG. 5, or in other words, the voltage $V_{N1}$ of the first node N1, when a charging signal that the digitizer 30 of the display apparatus 1 of FIG. 1 transmits to the input unit 100 is in an on state, or in other words, during the transmitting time slot On of FIG. 8. For convenience, FIGS. 10 and 11 illustrate that the voltage $V_{N1}$ of the first node N1 may be varied after the time point t3, but the voltage $V_{N1}$ of the first node N1 may be varied between the time point t1 and the time point t3, or before the time point t1. This is the same in the following embodiments and various modifications thereof. The dotted lines indicated in FIGS. 10 and 11 represent the voltage $V_{N1}$ of the first node N1 when a signal that the digitizer 30 transmits to the input unit 100 is in an off state as shown in FIG. 9.

As shown in FIGS. 10 and 11, when a signal that the digitizer 30 transmits to the input unit 100 is in an on state, the voltage $V_{N1}$ of the first node N1 may be influenced by the signal transmitted from the digitizer 30, and thus, may be varied. In more detail, FIG. 10 shows that the voltage $V_{N1}$ of the first node N1 is varied, when a signal that the digitizer 30 transmits to the input unit 100 is in an on state, to be higher than the voltage $V_{N1}$ of the first node N1 when a signal that the digitizer 30 transmits to the input unit 100 is in an off state. FIG. 11 shows that the voltage $V_{N1}$ of the first node N1 is varied, when a signal that the digitizer 30 transmits to the input unit 100 is in an on state, to be lower than the voltage $V_{N1}$ of the first node N1 when a signal that the digitizer 30 transmits to the input unit 100 is in an off state.

Figure 12:
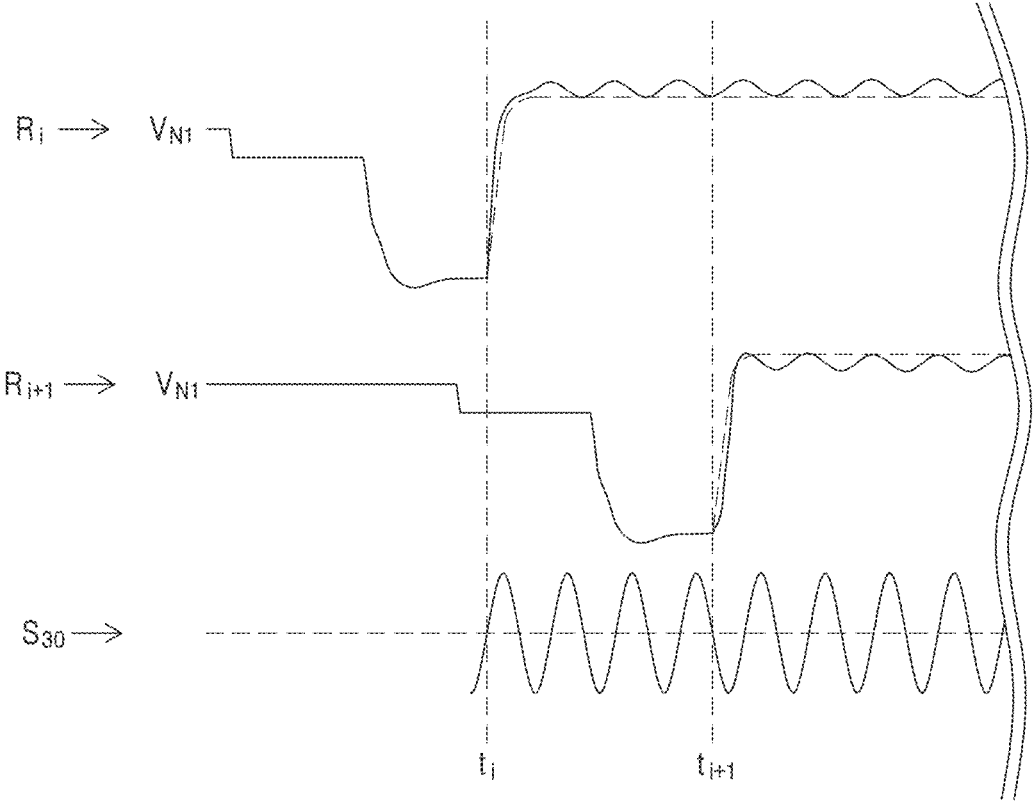
FIG. 12 is a waveform diagram showing a variation in a voltage of a gate electrode of a driving transistor in one row and a variation in a voltage of a gate electrode of a driving transistor in a next row when a signal that a display apparatus according to a comparative example transmits to an input unit is in an on state.

FIG. 12 is a waveform diagram showing a variation in a voltage of a gate electrode of a driving transistor in one row (an $i^{th}$ row $R_i$) and a variation in a voltage of a gate electrode of a driving transistor in a next row (an $(i+1)^{th}$ row $R_{i+1}$) when a signal that a display apparatus according to a comparative example transmits to an input unit is in an on state. FIG. 12 illustrates that a variation corresponding to that of FIG. 10 occurs in an $i^{th}$ row $R_i$, and a variation corresponding to that of FIG. 11 occurs in an $(i+1)^{th}$ row $R_{i+1}$. A difference between the variation in the $i^{th}$ row $R_i$ and the variation in the $(i+1)^{th}$ row $R_{i+1}$ is related to the phase of a signal $S_{30}$ that a digitizer transmits to an input unit. As shown in FIG. 12, the phase of the signal $S_{30}$ at a time point $t_i$ at which the supply of a data signal ends in the $i^{th}$ row $R_i$, or in other words, the time point $t_i$ at which a second transistor is turned off, is 0 degrees, whereas the phase of the signal $S_{30}$ at a time point $t_{i+1}$ at which the supply of a data signal ends in the $(i+1)^{th}$ row $R_{i+1}$, or in other words, the time point $t_{i+1}$ at which the second transistor is turned off, is 180 degrees.

Because the phase of the signal $S_{30}$ at the time point $t_i$ at which the supply of the data signal ends in the $i^{th}$ row $R_i$ is 0 degrees, immediately after that, the intensity of the signal $S_{30}$ increases, and due to this influence, the voltage $V_{N1}$ of a gate electrode of a driving transistor in the $i^{th}$ row $R_i$ further increases. Accordingly, the voltage $V_{N1}$ of the gate electrode of the driving transistor in the $i^{th}$ row $R_i$ may be varied as shown in FIG. 10. On the other hand, because the phase of the signal $S_{30}$ at the time point $t_{i+1}$ at which the supply of the data signal ends in the $(i+1)^{th}$ row $R_{i+1}$, is 180 degrees, immediately after that, the intensity of the signal $S_{30}$ decreases, and due to this influence, the voltage $V_{N1}$ of a gate electrode of a driving transistor in the $(i+1)^{th}$ row $R_{i+1}$ further decreases. Accordingly, the voltage $V_{N1}$ of the gate electrode of the driving transistor in the $(i+1)^{th}$ row $R_{i+1}$ may be varied as shown in FIG. 11.

Therefore, in the display apparatus according to the comparative example, although data signals that cause light of the same luminance to be emitted from the $i^{th}$ row $R_i$ and the $(i+1)^{th}$ row $R_{i+1}$ are input, the luminance in the $i^{th}$ row $R_i$ may be greater than the luminance in the $(i+1)^{th}$ row $R_{i+1}$. As such, although data signals that cause light of the same luminance to be emitted throughout a display region are input, an image with a stripe extending in the x-axis direction may appear in the display region, and thus, the quality of an image displayed by a display apparatus may be degraded.

Figure 13:
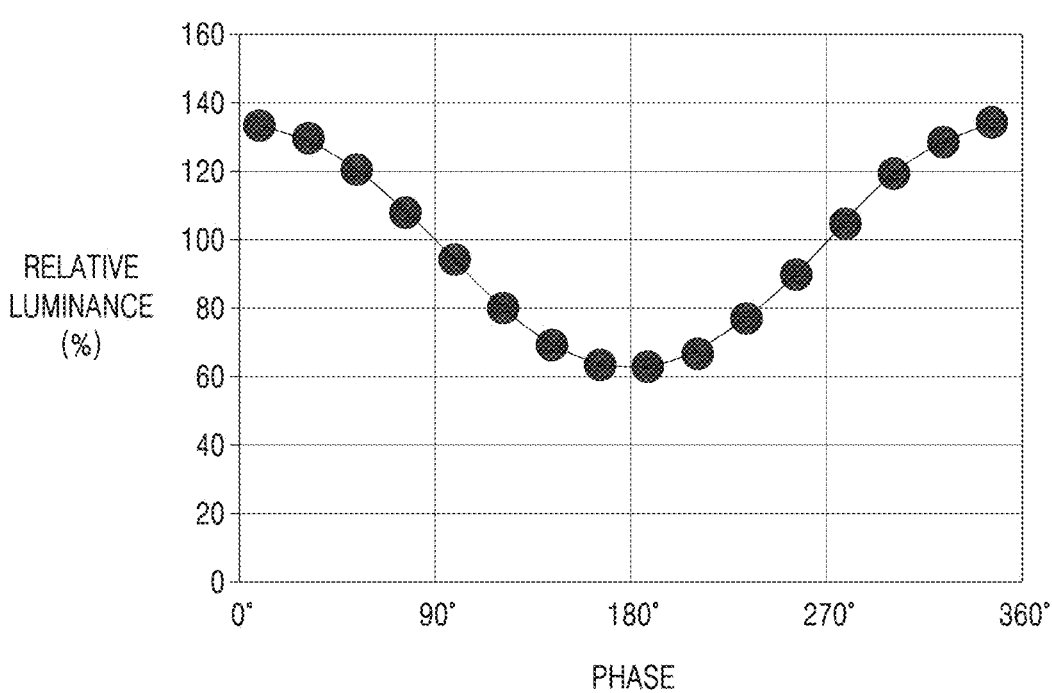
FIG. 13 is a graph showing a variation in a luminance of a pixel according to a phase shift of a signal that the display apparatus of FIG. 1 transmits to the input unit.

FIG. 13 is a graph showing a variation in a luminance of a pixel according to a phase shift of a signal that the display apparatus 1 of FIG. 1 transmits to the input unit 100. In FIG. 13, the luminance of the pixel when a signal that the digitizer 30 transmits to the input unit 100 is in an off state is expressed as 100%. The horizontal axis in the graph of FIG. 13 represents the phase of a signal that the digitizer 30 transmits at a moment when the supply of a data signal ends in the corresponding pixel. The vertical axis in the graph of FIG. 13 represents a relative luminance of the corresponding pixel.

As shown in FIG. 13, when the phase of a signal that the digitizer 30 transmits at a moment when the supply of a data signal ends in the corresponding pixel is 0 degrees, the luminance of the corresponding pixel may be varied to be maximized, and subsequently, the luminance of the corresponding pixel decreases until the phase reaches 180 degrees. Afterwards, the luminance of the corresponding pixel increases again until the phase reaches 360 degrees. Thus, the relative luminance when the phase is 0 degrees or 360 degrees reaches 133%, and the relative luminance when the phase is 180 degrees reaches 63%. Further, when phase is 90 degrees or 270 degrees, the relative luminance is 100%.

In order to prevent problems as described above with reference to FIG. 12, the display apparatus 1 according to the present embodiment may ensure that when the digitizer 30 transmits a charging signal, the frequency of the charging signal is synchronized to the unit period T. For reference, the unit period T may be a time taken from when the first scan signal G11 is applied to the first row of the display region DA to when the first scan signal G11 is applied to the same first row a next time.

As such, by ensuring that when the digitizer 30 transmits a charging signal, the frequency of the charging signal is synchronized to the unit period T, the phases of the charging signal at a moment when the scan signal is applied to each of the n rows are same. If the phases of the charging signal at the moment when the scan signal is applied to each of the n rows are same, at the moment when the application of the scan signals to the n rows ends, or in other words, when the supply of a data signal to the n rows ends, in other words, when the second transistor T2 is turned off in the n rows, the phases of the charging signal are the same. Accordingly, problems as described above may be effectively prevented from occurring or minimized. In the charging coil provided in the input unit 100, the number of coil windings per unit length may be set so that an induced current is generated by a resonance or the like in correspondence with the frequency of the charging signal. This is the same in the following embodiments and modifications thereof.

Figure 14:
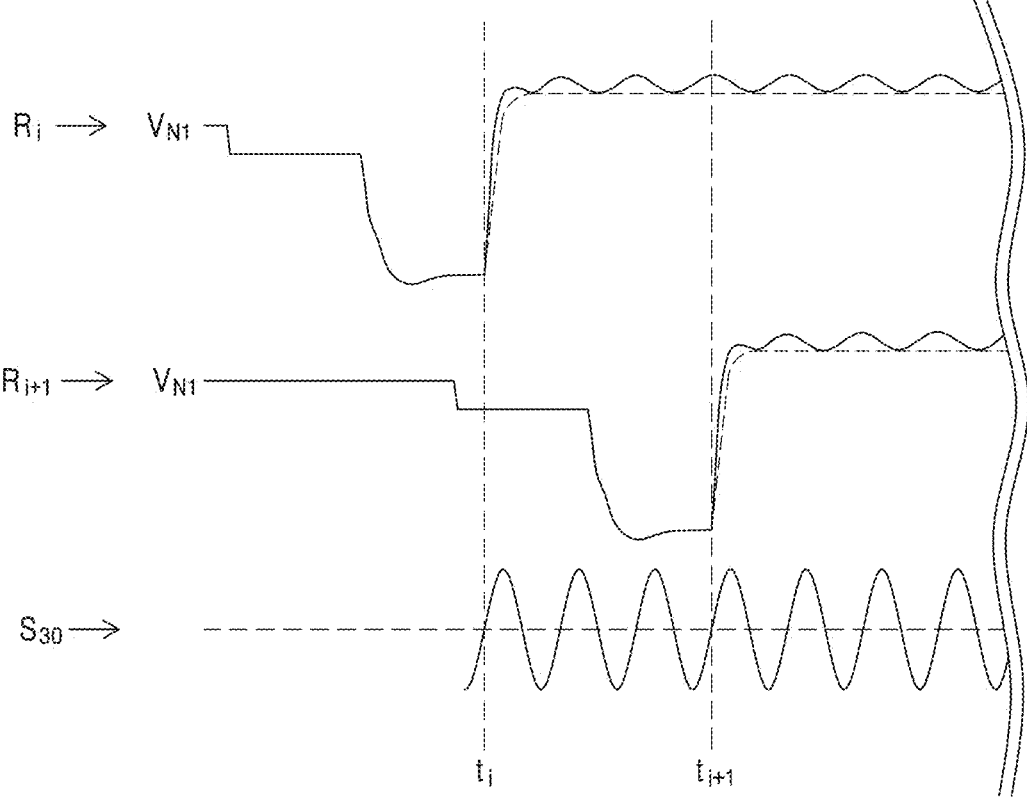
FIG. 14 is a waveform diagram showing a variation in a voltage of a gate electrode of a driving transistor in one row and a variation in a voltage of a gate electrode of a driving transistor in a next row when a signal that the display apparatus of FIG. 1 transmits to the input unit is in an on state.

FIG. 14 is a waveform diagram showing a variation in the voltage $V_{N1}$ of the gate electrode of the first transistor T1 in one row (the $i^{th}$ row $R_i$) and a variation in the voltage $V_{N1}$ of the gate electrode of the first transistor T1 in a next row (the $(i+1)^{th}$ row $R_{i+1}$) when the signal $S_{30}$ that the digitizer 30 of the display apparatus 1 of FIG. 1 transmits to the input unit 100 is in an on state. As shown in FIG. 14, because the phase of the signal $S_{30}$ at the time point $t_i$ at which the supply of the data signal ends in the $i^{th}$ row $R_i$ is 0 degrees, immediately after that, the intensity of the signal $S_{30}$ increases, and due to this influence, the voltage $V_{N1}$ of the gate electrode of the driving transistor in the $i^{th}$ row $R_i$ further increases. Accordingly, the voltage $V_{N1}$ of the gate electrode of the driving transistor in the $i^{th}$ row $R_i$ may be varied as shown in FIG. 10. Because the phase of the signal $S_{30}$ at the time point $t_{i+1}$ at which the supply of the data signal ends in the $(i+1)^{th}$ row $R_{i+1}$ is 0 degrees, immediately after that, the intensity of the signal $S_{30}$ increases, and due to this influence, the voltage $V_{N1}$ of the gate electrode of the driving transistor in the $(i+1)^{th}$ row $R_{i+1}$ further increases. Accordingly, the voltage $V_{N1}$ of the gate electrode of the driving transistor in the $(i+1)^{th}$ row $R_{i+1}$ may also be varied as shown in FIG. 10. As a result, when a data signal that causes light of the same luminance to be emitted throughout the display region DA of the display apparatus 1 is input to the display panel 50, light of approximately the same luminance may be emitted throughout the display region DA.

As such, according to the present embodiment when the digitizer 30 transmits a charging signal, the frequency of the charging signal may be synchronized to the unit period T. In more detail, the frequency of the charging signal may be set to $(n \times k)/T$. In this regard, k is a natural number. By setting the frequency of the charging signal to $(n \times k)/T$, the phases of the charging signal at the moment when the scan signal is applied to each of the n rows are the same. Accordingly, while the digitizer 30 transmits the charging signal, a high-quality image may be displayed in the display region DA.

Even when an image is displayed according to the varied voltage $V_{N1}$ of the gate electrode as shown in FIG. 14 during the transmitting time slot On in which the digitizer 30 transmits a charging signal, an image may be displayed according to the unvaried voltage $V_{N1}$ of the gate electrode as shown in FIG. 9 during the receiving time slot Off in which the digitizer 30 does not transmit a charging signal. For example, the varied voltage $V_{N1}$ of the gate electrode as shown in FIG. 14 may be greater than the unvaried voltage $V_{N1}$ of the gate electrode as shown in FIG. 9. Therefore, considering that the transmitting time slots On in which the digitizer 30 transmits a charging signal and the receiving time slots Off in which the digitizer 30 does not transmit a charging signal are periodically repeated, the luminance of an image displayed in the display region DA of the display apparatus 1 may vary according to the frequency of repetition of the transmitting time slot On and the receiving time slot Off. This may lead to a degradation in the quality of the image displayed by the display apparatus 1.

Therefore, in some embodiments, in each of the n rows, the phase of the charging signal at a moment when a scan signal application ends may be set to 90 degrees. As described above with reference to FIG. 13, this is because when the phase of the charging signal is 90 degrees, the relative luminance of the corresponding pixel is approximately 100%.

Figure 15:
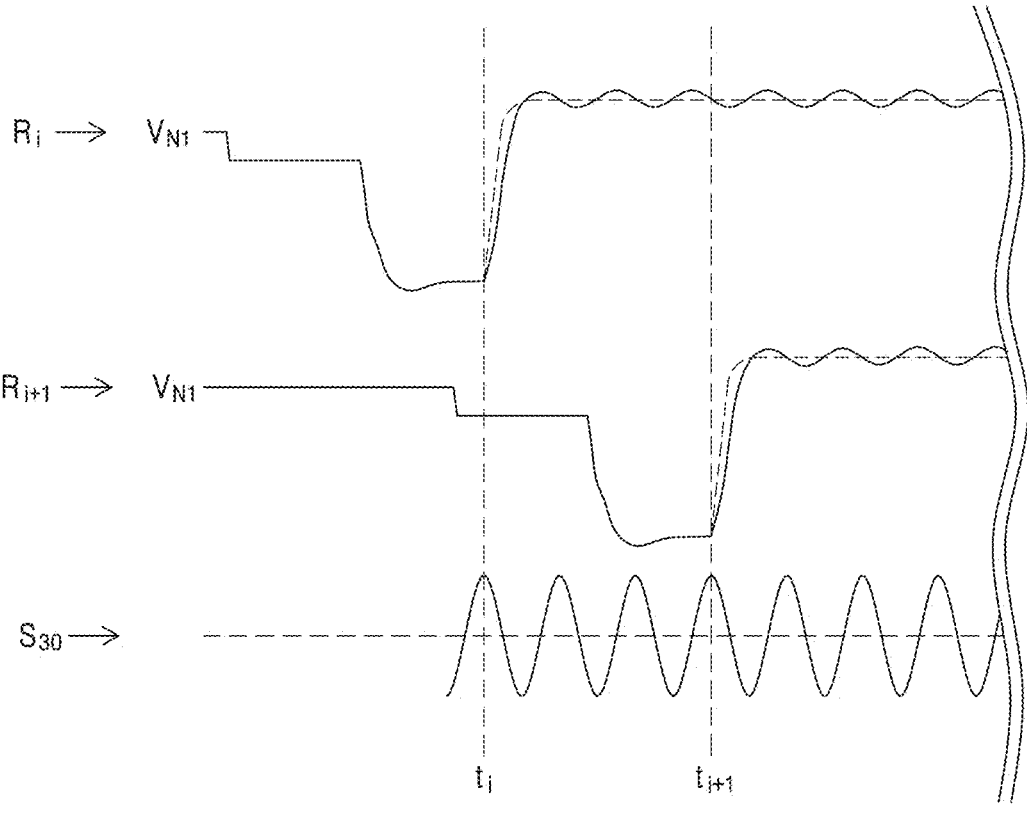
FIG. 15 is a waveform diagram showing a variation in a voltage of a gate electrode of a driving transistor in one row and a variation in a voltage of a gate electrode of a driving transistor in a next row when a signal that a display apparatus according to an embodiment transmits to an input unit is in an on state.

FIG. 15 is a waveform diagram showing a variation in the voltage $V_{N1}$ of the gate electrode of the first transistor T1 in the $i^{th}$ row $R_i$ and a variation of the voltage $V_{N1}$ in the gate electrode of the first transistor T1 in the $(i+1)^{th}$ row $R_{i+1}$ when the phase of the charging signal at the moment when the scan signal application ends is 90 degrees. In FIG. 15, it may be confirmed that the average of the voltages $V_{N1}$ of the gate electrodes of the first transistors T1 in the $i^{th}$ row $R_i$ and the $(i+1)^{th}$ row $R_{i+1}$ during the transmitting time slot On in which the digitizer 30 transmits a charging signal is approximately similar to the voltages $V_{N1}$ of the gate electrodes of the first transistors T1 in the $i^{th}$ row $R_i$ and the $(i+1)^{th}$ row $R_{i+1}$ during the receiving time slot Off in which the digitizer 30 does not transmit a charging signal as indicated by dotted lines.

Figure 16:
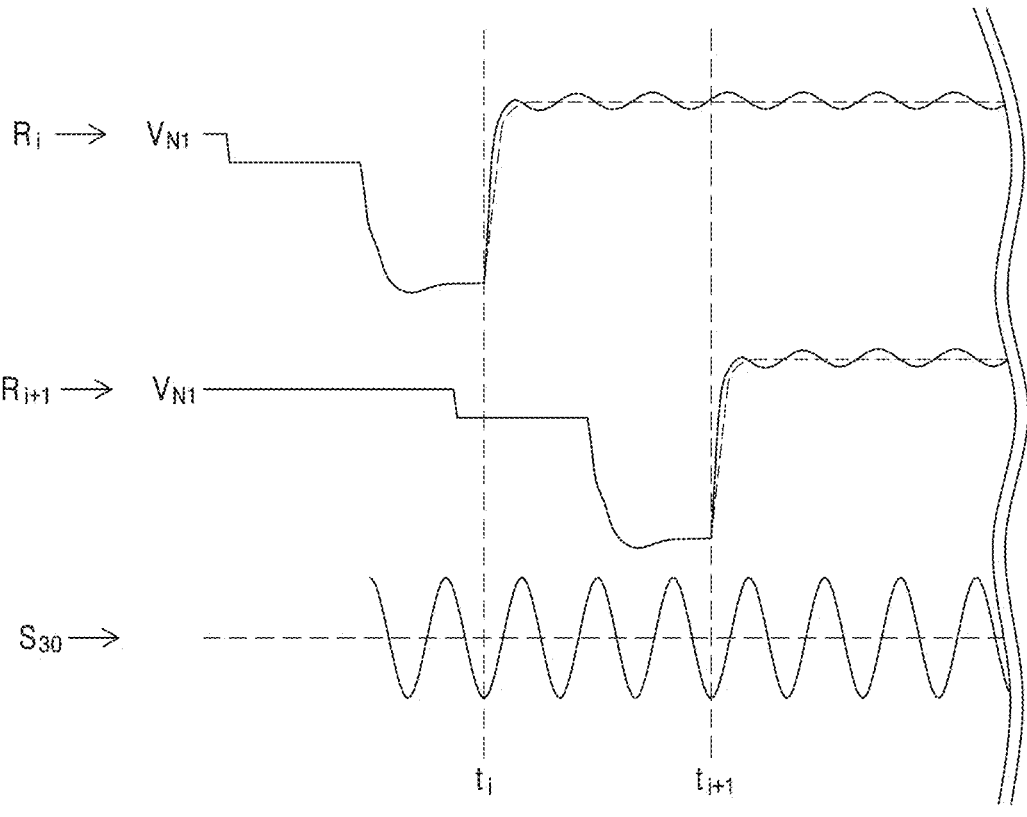
FIG. 16 is a waveform diagram showing a variation in a voltage of a gate electrode of a driving transistor in one row and a variation in a voltage of a gate electrode of a driving transistor in a next row when a signal that a display apparatus according to an embodiment transmits to an input unit is in an on state.

In each of the n rows, the phase of a charging signal at a moment when scan signal application ends may be set to 270 degrees instead of 90 degrees. FIG. 16 is a waveform diagram showing this case. In other words, FIG. 16 is a waveform diagram showing a variation in the voltage $V_{N1}$ of the gate electrode of the first transistor T1 in the $i^{th}$ row $R_i$ and a variation in the voltage $V_{N1}$ of the gate electrode of the first transistor T1 in the $(i+1)^{th}$ row $R_{i+1}$ when the phase of the charging signal at the moment when scan signal application ends is 270 degrees. In FIG. 16, it may be confirmed that the average of the voltages $V_{N1}$ of the gate electrodes of the first transistors T1 in the $i^{th}$ row $R_i$ and the $(i+1)^{th}$ row $R_{i+1}$ during the transmitting time slot On in which the digitizer 30 transmits the charging signal is substantially similar to the voltages $V_{N1}$ of the gate electrodes of the first transistors T1 in the $i^{th}$ row $R_i$ and the $(i+1)^{th}$ row $R_{i+1}$ during the receiving time slot Off in which the digitizer 30 does not transmit the charging signal as indicated by dotted lines.

In more detail, when the phase of a charging signal at a moment when scan signal application ends is set to 270 degrees, additional effects may be obtained.

The first power source ELVDD may be electrically connected to pixels by power supply lines extending to cross the display region DA in the y-axis direction. As such, because the power supply lines extend in the y-axis direction, a voltage drop (IR drop) may inevitably occur in each of the power supply lines. Accordingly, although a data signal corresponding to a same luminance is applied to the pixels throughout the display region DA, the luminance in a central portion of the display region DA or a first portion of the display region DA (e.g., a portion of the display region DA in the +y direction from the central portion) may be lower than the luminance in a second portion of the display region DA (e.g., a portion of the display region DA in the −y direction from the central portion). However, when the phase of a charging signal at a moment when a scan signal application ends is set to 270 degrees, the degree of a decrease in luminance in the central portion of the display region DA or the first portion of the display region DA (in the +y direction) may be reduced.

The charging signal generated by the digitizer 30 may experience a greater RC delay at the first portion of the display region DA in the +y direction than at the second portion of the display region DA in the −y direction, and thus, the phase of the charging signal may be shifted. In other words, if the phase of the charging signal at the moment when the scan signal application ends is set to be 270 degrees, then although the phase of the charging signal at the moment when the scan signal application ends becomes 270 degrees in the second portion of the display region DA, the phase of the charging signal at the moment when the scan signal application ends may be slightly greater than 270 degrees in the first portion of the display region DA due to the RC delay. As described above with reference to FIG. 13, when the phase of a charging signal at a moment when scan signal application ends is greater than 270 degrees, the luminance of a pixel increases.

Figure 17:
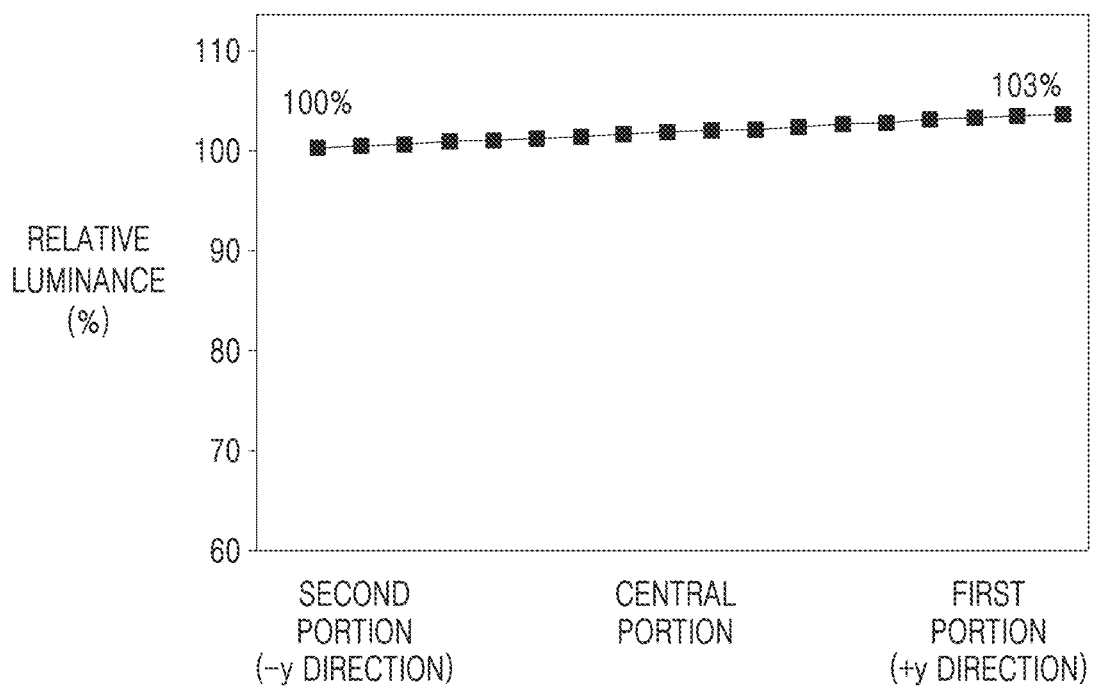
FIG. 17 is a graph showing a variation in a luminance according to the position of a panel when a signal that a display apparatus according to an embodiment transmits to an input unit is in an on state.

FIG. 17 is a graph showing a variation in a luminance according to the position of a panel when a signal that a display apparatus according to an embodiment transmits to an input unit is in an on state. FIG. 17 shows a luminance variation resulting from an occurrence of an RC delay, which is greater in the first portion of the display region DA than in the second portion of the display region DA, assuming that no voltage drop (IR drop) occurs in the power supply lines. When the phase of a charging signal at a moment when scan signal application ends is set to 270 degrees, the luminance in the first portion of the display region DA is greater than the second portion of the display region DA. Therefore, the degree of a decrease in luminance in the central portion of the display region DA or the first portion of the display region DA (e.g., in the +y direction) due to voltage drops (IR drops) in the power supply lines may be reduced.

Figure 18:
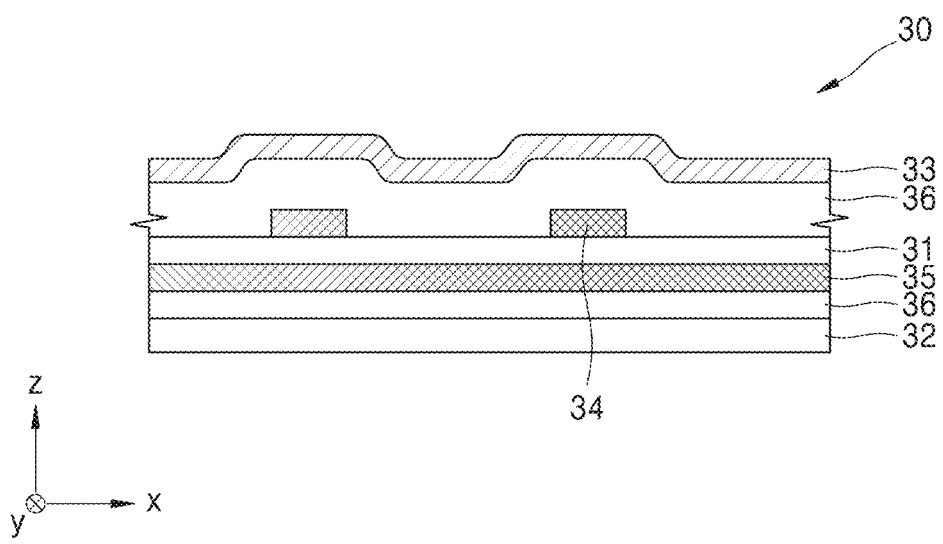
FIG. 18 is a schematic cross-sectional view of a digitizer that may be provided in a display apparatus according to an embodiment.

FIG. 18 is a schematic cross-sectional view of the digitizer 30 that may be provided in the display apparatus 1 according to an embodiment.

The digitizer 30 may include a body 31, first patterns 35, and second patterns 34. The first patterns 35 and the second patterns 34 may include a conductive material. Each of the first patterns 35 may have a shape extending in the x-axis direction so as to be parallel to the n rows. Each of the second patterns 34 may have a shape extending in the y-axis direction to cross the n rows. The first patterns 35 and the second patterns 34 may be disposed on different surfaces of the body 31. One of the first patterns 35 and/or the second patterns 34 may include connection bridges so that the first patterns 35 and the second patterns 34 are disposed at (e.g., in or on) the same surface of the body 31 without being in contact with each other. For example, each of the second patterns 34 includes portions disconnected and spaced apart from each other so that the second patterns 34 are disposed at (e.g., in or on) the same layer as that of the first patterns 35 without being in contact with the first patterns 35, and connection bridges that are disposed at (e.g., in or on) a different layer from that of the first patterns 35 so as not to be in contact with the first patterns 35 may electrically connect the portions of the second patterns 34 to each other.

Each of the first patterns 35 may include a loop coil shape. Each of the second patterns 34 may include a loop coil shape. The first patterns 35 and the second patterns 34 generate a charging signal as described above, and transmit the charging signal to the input unit 100. For example, the charging signal may be generated by the first patterns 35. A position signal generated by the input unit 100 may be received via the first patterns 35 and/or the second patterns 34.

The digitizer 30 may include at least one of a first cover layer 32 covering the first patterns 35 and/or a second cover layer 33 covering the second patterns 34. The first cover layer 32 and the second cover layer 33 may prevent the first patterns 35 and the second patterns 34 from being oxidized by exposure to external moisture or oxygen.

An adhesive layer 36 may be arranged between the first cover layer 32 and the first patterns 35, and between the second cover layer 33 and the second patterns 34. As necessary or desired, the adhesive layer 36 may be integrated with the first cover layer 32 and/or the second cover layer 33.

While the display apparatus 1 has been described above, the present disclosure is not limited thereto. In other words, a method of controlling the display apparatus 1 may be included in the spirit and the scope of the present disclosure. For example, assuming that T is a time taken from when a scan signal is applied to the first row of the display panel 50 including the display region DA in which pixels are arranged in the n rows to when a scan signal is applied to the same first row, the display apparatus may be controlled so that when the digitizer 30 arranged to overlap with the display panel 50 transmits a charging signal to the input unit 100, the frequency of the charging signal is synchronized to T. In other words, the display apparatus may be controlled so that the phases of the charging signal at a moment when the scan signal is applied to each of the n rows are the same. In more detail, when k is a natural number, the display apparatus may be controlled so that the frequency of the charging signal is set to (n×k)/T.

Such control may be achieved by the main controller disposed on the main circuit board. The main controller may be integrated with the display controller 57. In addition, such control may be achieved by a digitizer controller disposed on a printed circuit board electrically connected to the digitizer 30. The digitizer controller may be located on the main circuit board.

In addition, the description of the charging signal and the description of the phase of the charging signal, as described above, may be applied to a method of controlling a display apparatus.

According to one or more embodiments of the present disclosure, a display apparatus capable of displaying a high-quality image, and a method of controlling the same, may be implemented. However, the aspects and features of the present disclosure are not limited thereto.

The electronic or electric devices and/or any other relevant devices or components according to embodiments of the present disclosure described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the example embodiments of the present disclosure.

The foregoing is illustrative of some embodiments of the present disclosure, and is not to be construed as limiting thereof. Although some embodiments have been described, those skilled in the art will readily appreciate that various modifications are possible in the embodiments without departing from the spirit and scope of the present disclosure. It will be understood that descriptions of features or aspects within each embodiment should typically be considered as available for other similar features or aspects in other embodiments, unless otherwise described. Thus, as would be apparent to one of ordinary skill in the art, features, characteristics, and/or elements described in connection with a particular embodiment may be used singly or in combination with features, characteristics, and/or elements described in connection with other embodiments unless otherwise specifically indicated. Therefore, it is to be understood that the foregoing is illustrative of various example embodiments and is not to be construed as limited to the specific embodiments disclosed herein, and that various modifications to the disclosed embodiments, as well as other example embodiments, are intended to be included within the spirit and scope of the present disclosure as defined in the appended claims, and their equivalents.

What is claimed is:

1. A display apparatus comprising:
   a display panel comprising a display region comprising pixels located in n rows, where n is a natural number; and
   a digitizer overlapping with the display panel, the digitizer configured to transmit a charging signal to an input unit and receive a position signal from the input unit,
   wherein, when the digitizer transmits the charging signal to the input unit, a frequency of the charging signal is synchronized to T, where T is a time taken from when a scan signal is applied to a first row of the display region from among the n rows to when a scan signal is applied to the first row a next time.

2. The display apparatus of claim 1, wherein phases of the charging signal at a moment when a corresponding scan signal is applied to each of the n rows are the same.

3. The display apparatus of claim 1, wherein the frequency of the charging signal is (n×k)/T, where k is a natural number.

4. The display apparatus of claim 1, wherein the charging signal is a signal to generate an induced current in a charging coil of the input unit.

5. The display apparatus of claim 1, wherein the charging signal has a sine wave waveform.

6. The display apparatus of claim 5, wherein phases of the charging signal at a moment when a scan signal application ends in each of the n rows are the same.

7. The display apparatus of claim 5, wherein, in each of the n rows, a phase of the charging signal at a moment when a scan signal application ends is 90 degrees.

8. The display apparatus of claim 5, wherein, in each of the n rows, a phase of the charging signal at a moment when a scan signal application ends is 270 degrees.

9. The display apparatus of claim 1, wherein the digitizer comprises a plurality of first patterns extending to be parallel to the n rows, and
   wherein the plurality of first patterns is configured to generate the charging signal.

10. The display apparatus of claim 9, wherein the digitizer further comprises a plurality of second patterns extending to cross the n rows.

11. A method of controlling a display apparatus comprising a display panel comprising pixels located in n rows, where n is a natural number, the method comprising:

transmitting, by a digitizer overlapping with the display panel, a charging signal to an input unit; and when the digitizer transmits the charging signal, synchronizing a frequency of the charging signal to T, where T is a time taken from when a scan signal is applied to a first row of a display region from among the n rows to when a scan signal is applied to the first row a next time.

12. The method of claim 11, wherein phases of the charging signal at a moment when a corresponding scan signal is applied to each of the n rows are the same.

13. The method of claim 11, wherein the frequency of the charging signal is (n×k)/T, where k is a natural number.

14. The method of claim 11, wherein the charging signal is a signal to generate an induced current in a charging coil of the input unit.

15. The method of claim 11, wherein the charging signal has a sine wave waveform.

16. The method of claim 15, wherein phases of the charging signal at a moment when a scan signal application ends in each of the n rows are the same.

17. The method of claim 15, wherein, in each of the n rows, a phase of the charging signal at a moment when a scan signal application ends is 90 degrees.

18. The method of claim 15, wherein, in each of the n rows, a phase of the charging signal at a moment when a scan signal application ends is 270 degrees.

\* \* \* \* \*